(12) United States Patent
Riscalla

(10) Patent No.: US 10,726,386 B1
(45) Date of Patent: Jul. 28, 2020

(54) SYSTEMS AND METHODS FOR CONDUCTING INVENTORIES

(71) Applicant: Daniel Riscalla, Orange, CA (US)

(72) Inventor: Daniel Riscalla, Orange, CA (US)

( * ) Notice: Subject to any disclaimer, the term of this patent is extended or adjusted under 35 U.S.C. 154(b) by 645 days.

(21) Appl. No.: 14/817,165

(22) Filed: Aug. 3, 2015

Related U.S. Application Data

(60) Provisional application No. 62/032,482, filed on Aug. 1, 2014.

(51) Int. Cl.
| | |
|---|---|
| *G06Q 10/00* | (2012.01) |
| *G06Q 10/08* | (2012.01) |
| *G06F 3/0484* | (2013.01) |
| *G06F 3/0482* | (2013.01) |

(52) U.S. Cl.
CPC ......... *G06Q 10/087* (2013.01); *G06F 3/0482* (2013.01); *G06F 3/04842* (2013.01); *G06F 3/04847* (2013.01)

(58) Field of Classification Search
CPC ............................ G06Q 10/087; G06F 3/0482
USPC ...................................... 705/26, 28
See application file for complete search history.

(56) References Cited

U.S. PATENT DOCUMENTS

| | | | | |
|---|---|---|---|---|
| 7,693,757 B2* | 4/2010 | Zimmerman | .......... | G06Q 10/00 235/462.11 |
| 2008/0027835 A1* | 1/2008 | LeMasters | ........... | G06Q 10/087 705/28 |
| 2014/0249947 A1* | 9/2014 | Hicks | ................... | G06Q 10/087 705/21 |

* cited by examiner

*Primary Examiner* — Rokib Masud
(74) *Attorney, Agent, or Firm* — William A. English; Vista IP Law Group LLP

(57) ABSTRACT

Systems and methods are provided for conducting inventories using an electronic device. For example, the systems and methods herein may facilitate conducting inventories, e.g., for inventorying food products and/or other supplies for a restaurant. Such systems and methods may involve using an electronic device, such as a wireless and/or mobile devices, e.g., a smart cellular telephone, a tablet computer, and the like. In addition, the electronic device may be included in a system that records inventories, deliveries, and the like, and compares them to previous inventories, sales, and the like, e.g. to project future orders for supplies, to identify losses, such as waste or theft, and the like.

21 Claims, 33 Drawing Sheets

Store 11271

Store 1465

Store 59747

Store 80000 ✓

Locations

Backroom    Freezer    Refrigerator    Front Counter    Restaurant

FIG. 8F

| | | | | | | | | | |
|---|---|---|---|---|---|---|---|---|---|
| Egg White Patty | 0 | 0 | 0 | 0 | each | 44ct | 88ct | | |
| Omelet Egg Patty | 0 | 0 | 0 | 0 | each | 44ct | 88ct | | |
| ApWd Pull Pork | 0 | 0 | 0 | 0 | lb | 2.5lb | 20lb | | |
| Bacon | 0 | 0 | 0 | 0 | each | 150ct | 600ct | | |
| Capicolla | 1 | 1 | 0 | 0 | lb | 2lb | 18lb | | |
| Chicken | 5 | 5 | 0 | 0 | lb | 5lb | 25lb | | |
| Chicken Salad | 0 | 0 | 0 | 0 | lb | 3lb | 12lb | | |

FIG. 8G

Select or create an Inventory:

WEEK ENDING JUN 17, 2014

Jun 12, 2014, 1:23 PM - Ite...
Last updated: Jun 17, 2014, 2:58 PM

Jun 11, 2014, 5:25 PM - Ite...
Last updated: Jun 11, 2014, 5:25 PM

WEEK ENDING JUN 10, 2014

Jun 4, 2014, 8:12 AM - Ite...
Last updated: Jun 11, 2014, 7:56 AM

WEEK ENDING JUN 3, 2014

Jun 5, 2014, 9:32 AM - Ite...
Last updated: Jun 5, 2014, 9:45 AM

Jun 4, 2014, 4:50 PM - Ite...
Last updated: Jun 4, 2014, 4:50 PM

May 29, 2014, 1:00 PM - It...
Last updated: May 31, 2014, 10:15 AM

May 29, 2014, 12:28 PM - I...
Last updated: May 29, 2014, 12:49 PM

WEEK ENDING MAY 27, 2014

Store 11271

Store 1465

Store 59747

Store 80000

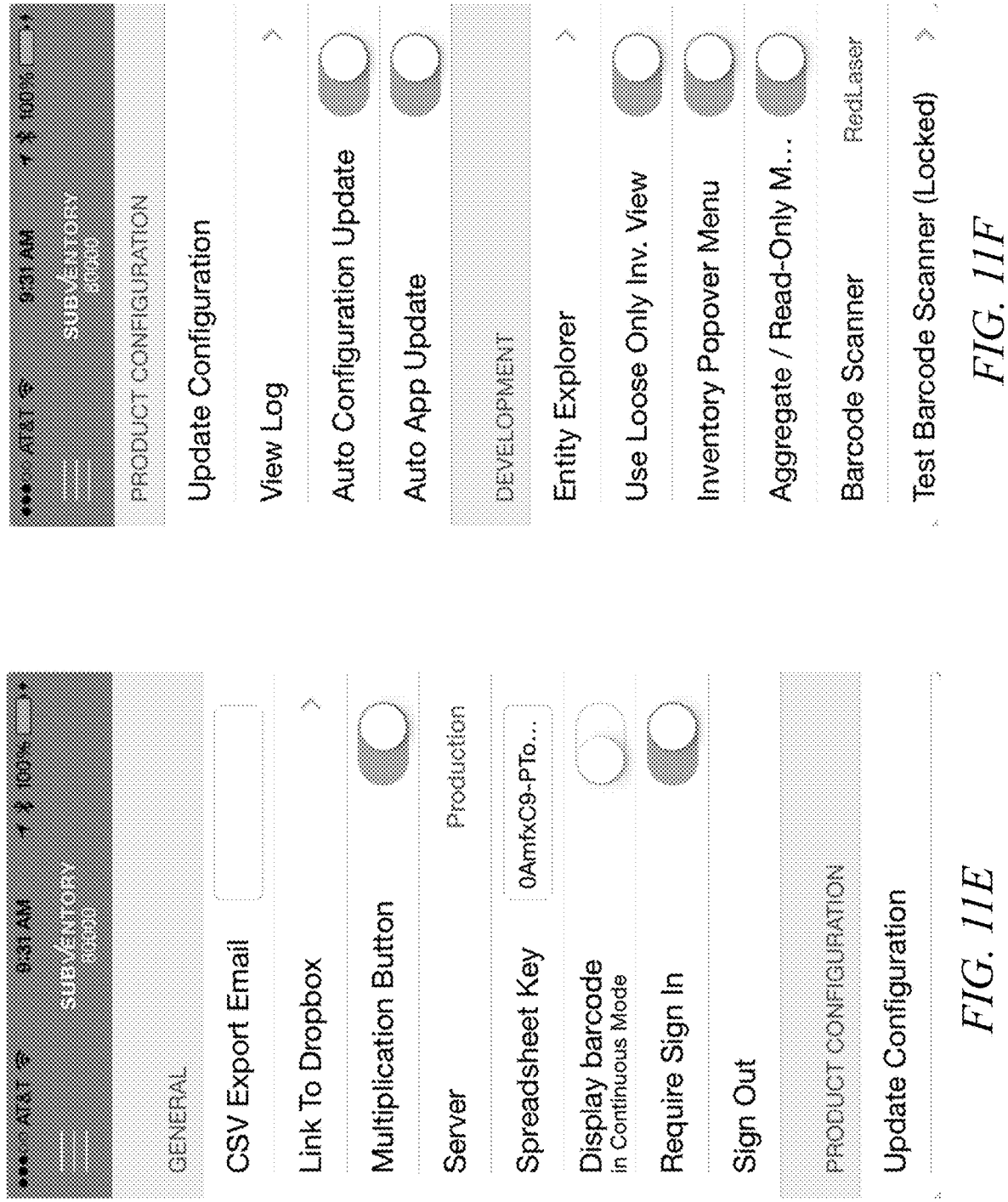

| | | | | |
|---|---|---|---|---|
| Patty | 0 | 0 | 0 | 0 |
| Omelet Egg Patty | 0 | 0 | 0 | 0 |
| ApWd Pull Pork | 0 | 0 | 0 | 0 |
| Bacon | 0 | 0 | 0 | 0 |
| Capicolla | 1 | 1 | 0 | 0 |
| Chicken | 5 | 5 | 0 | 0 |
| Chicken Salad | 0 | 0 | 0 | 0 |
| Chicken Strips | 4 | 4 | 0 | 0 |
| Genoa | 0 | 0 | 0 | 0 |
| Ham | 0 | 0 | 0 | 0 |
| Mortadella | 1 | 1 | 0 | 0 |
| Pastrami | 0 | 0 | 0 | 0 |
| Pepperoni | 0 | 0 | 0 | 0 |
| Roast Beef | 7 | 7 | 7 | 0 |

*FIG. 12H*

Inventory Export

Is this for the Week-End Inventory or for Delivery?

WE Inventory

Delivery

Cancel

*FIG. 12I*

SYSTEMS AND METHODS FOR CONDUCTING INVENTORIES

RELATED APPLICATION DATA

The present application claims benefit of provisional application Ser. No. 62/032,482, filed Aug. 1, 2014, the entire disclosure of which is expressly incorporated by reference herein.

FIELD OF THE INVENTION

The present invention relates to apparatus, systems, and methods for conducting inventories, e.g., for inventorying food products and/or other supplies for a restaurant, store, or other business location, using an electronic device, such as a wireless and/or mobile device, e.g., a smart cellular telephone, tablet computer, and the like, via a network, such as a telecommunications network and/or the Internet.

BACKGROUND

Generally, businesses periodically complete inventories of their supplies. For example, a restaurant may conduct an inventory on a weekly basis of the food products and/or other supplies on hand at the restaurant. Such inventories are generally completed by personnel manually counting packages and/or items individually, which may require weighing or otherwise estimating partial packages or containers of supplies. The quantities and items may be registered manually on paper and then subsequently added up to obtain totals, which may increase the risk of errors.

Further, another complication with such inventorying is that similar products may be stored in multiple locations within the restaurant and/or may be stored in various sized packages, partial packages, and/or containers. Thus, there is risk that personnel conducting the inventory may register a package or container of a particular item incorrectly, i.e., as a different size package or container than the actual package or container on hand or associate an entry with the incorrect item. Such mistakes will introduce errors in the totals, which may not match totals expected, e.g., based on previous inventories, sales, deliveries, and the like. Such errors may then require recounting and/or otherwise duplicating efforts to identify and/or correct the errors.

Accordingly, systems and methods that facilitate conducting inventories would be useful.

SUMMARY

The present invention is directed to apparatus, systems, and methods for conducting inventories using an electronic device. More particularly, the present invention is directed to systems and methods for conducting inventories, e.g., for inventorying food products and/or other supplies for a restaurant, store, or other business location. Such systems and methods may involve using an electronic device, such as a wireless and/or mobile devices, e.g., a smart cellular telephone, a tablet computer, and the like. In addition, the electronic device may be included in a system that records inventories, deliveries, and the like, and compares them to previous inventories, sales, and the like, e.g. to project future orders for supplies, to identify losses, such as waste or theft, and the like.

In accordance with one embodiment, a method is provided for conducting an inventory for a delivery including a plurality of packages containing supplies that includes activating a scanner of a portable electronic device; scanning labels of the packages using the scanner to identify items in each of the packages and quantities of the items in each of the packages; presenting the quantities on a display of the portable electronic device; comparing the quantities of the items with a list of expected items; and presenting on the display any differences between the quantities identified using the scanner and quantities of the expected items on the list.

In accordance with another embodiment, an electronic device is provided for conducting an inventory of a delivery including a plurality of packages containing supplies for a restaurant or other store using a mobile electronic device that includes a display; a scanner; a user interface; and a processor communicating with the display, scanner, and user interface and configured to identify labels of the packages when the scanner is activated via the user interface to identify items in each of the packages and quantities of the items in each of the packages; present the quantities on the display; compare the quantities of the items with a list of expected items; and present on the display any differences between the quantities identified using the scanner and quantities of the expected items on the list.

In accordance with still another embodiment, a system is provided for conducting an inventory of products on-hand for a restaurant or other store that includes a plurality of portable electronic devices, each device comprising a display, a user interface, and a processor configured to present a series of menus on the display identifying storage locations at the store, categories and individual items that may be stored at respective storage locations, and to provide an interface in which a user of each device selects individual storage locations at the store and enters via the user interface quantities of items stored at the individual storage locations.

In accordance with yet another embodiment, a method is provided for conducting an inventory of products on-hand for a restaurant or other store using a plurality of portable electronic devices comprising displays and user interfaces. The method includes presenting a series of menus on each display identifying storage locations at the store, categories and individual items that may be stored at respective storage locations; and providing an interface in which a user of each device selects individual storage locations at the store and enters via the user interface quantities of items stored at the individual storage locations.

In accordance with another embodiment, a method is provided for conducting an inventory of products on-hand for a restaurant or other store using a mobile electronic device that includes presenting on a display of the electronic device a location menu of available storage locations at the store; selecting, using a user interface of the electronic device, a first storage location from the location menu, whereupon a first category menu is presented on the display that includes a plurality of categories of products to be inventoried; selecting, using the user interface, a first category from the first category menu, whereupon a first item menu is presented on the display that includes representations of items within the first category; selecting, using the user interface, a first item from the first item menu, whereupon a quantity menu is presented on the display; entering, using the user interface, a quantity into the quantity menu corresponding to the quantity of the first item at the first location within the store; and selecting, using the user interface, a finished icon when the quantity is entered, whereupon the first item menu is presented on the display, and wherein a representation of the first item includes an indicator that the quantity has been entered.

In accordance with still another embodiment, an electronic device is provided for conducting an inventory of products on-hand for a restaurant or other store using a mobile electronic device that includes a display; a user interface; and a processor communicating with the display and the user interface. The processor may be configured to present on the display a location menu of available storage locations at the store; identify via the user interface a first storage location selected from the location menu, whereupon a first category menu is presented on the display that includes a plurality of categories of products to be inventoried; identify via the user interface a first category selected from the first category menu, whereupon a first item menu is presented on the display that includes representations of items within the first category; identify via the user interface a first item selected from the first item menu, whereupon a quantity menu is presented on the display; identify from the user interface a quantity entered into the quantity menu corresponding to the quantity of the first item at the first location within the store; and identify via the user interface when a finished icon is selected after the quantity is entered, whereupon the first item menu is presented on the display, and wherein a representation of the first item includes an indicator that the quantity has been entered.

Other aspects and features of the present invention will become apparent from consideration of the following description taken in conjunction with the accompanying drawings.

BRIEF DESCRIPTION OF THE DRAWINGS

The drawings illustrate exemplary embodiments of the invention, in which:

FIG. 8D shows a summary of an inventory completed on Jun. 29, 2014, identified on the inventory-type menu as a WISR inventory, e.g., a weekly inventory of food products and supplies on hand. FIG. 8E shows a summary of an Ordering inventory, e.g., inventorying one or more products that have been delivered to the store. Optionally, the user may select the Report icon, whereupon the inventory device may present the selected report on the display, e.g., as shown in FIGS. 8F and 8G.

Figure 1:
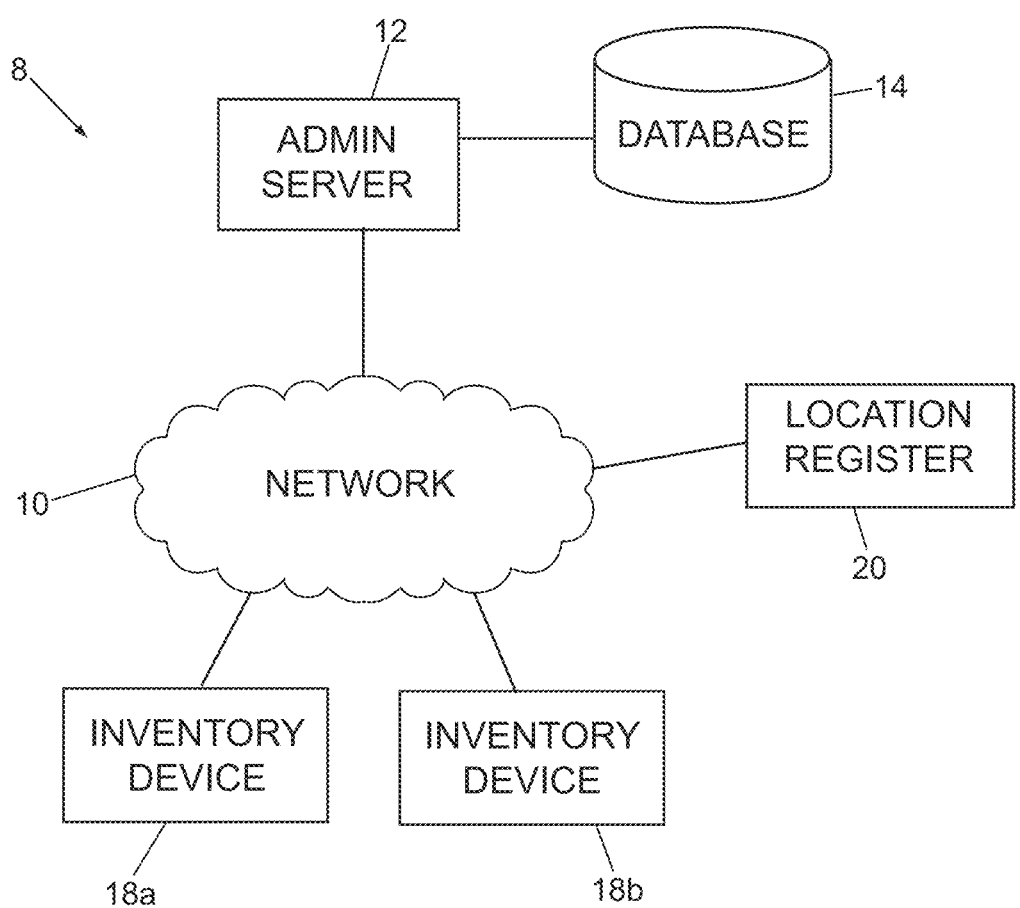
FIG. 1 is a schematic drawing showing a network architecture providing an exemplary embodiment of a system for conducting inventories, e.g., of food products and/or supplies within a restaurant.

Once any review is complete and the inventory is ready to be exported, the user may select the "Done" icon, which returns the user to the previous page. Alternatively, an Export icon may be presented allowing the user select and/or confirm that inventory information should be exported. The inventory device may then create a data file that is transmitted to a remote location, e.g., to the administrator server 12 and/or location register 20 via the network, as shown in FIG. 1. For example, the administrator server 12 may receive and store the data file in the database 14 for subsequent review and/or analysis. In addition or alternatively, the administrator server 12 may receive the data file and send a notice or the entire data file to the location register 20, again for subsequent review and/or analysis.

Figure 8A:
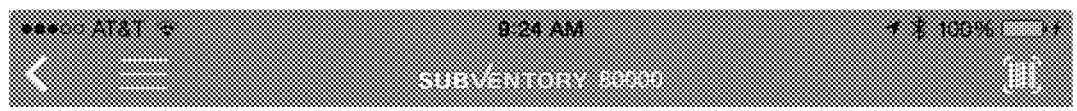
FIG. 8A is a screen shot showing an exemplary Location page that may be presented when an icon is selected from the main menu, e.g., the "Inventory" icon, "Ingredients" icon, or "Containers/Bottles" icon, e.g., to allow a user to create or access an inventory action, search inventory, and/or generate one or more reports. As shown, the default image presented on the inventory device when one of these icons is selected may include a locations menu including storage location fields, e.g., including representative images and/or text identifying storage locations at the selected store. Alternatively, other menus or pages may be presented as the default image, e.g., selected by the user or an administrator of the inventory device.
Figure 8A:
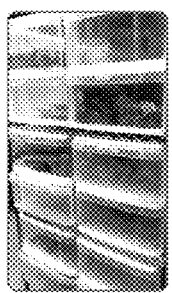
Figure 8A:
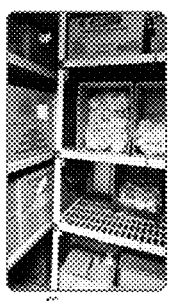
Figure 8A:
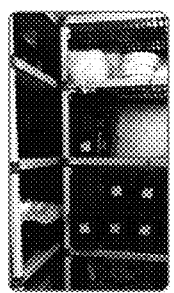
Figure 8A:
Figure 8A:
Figure 8B:
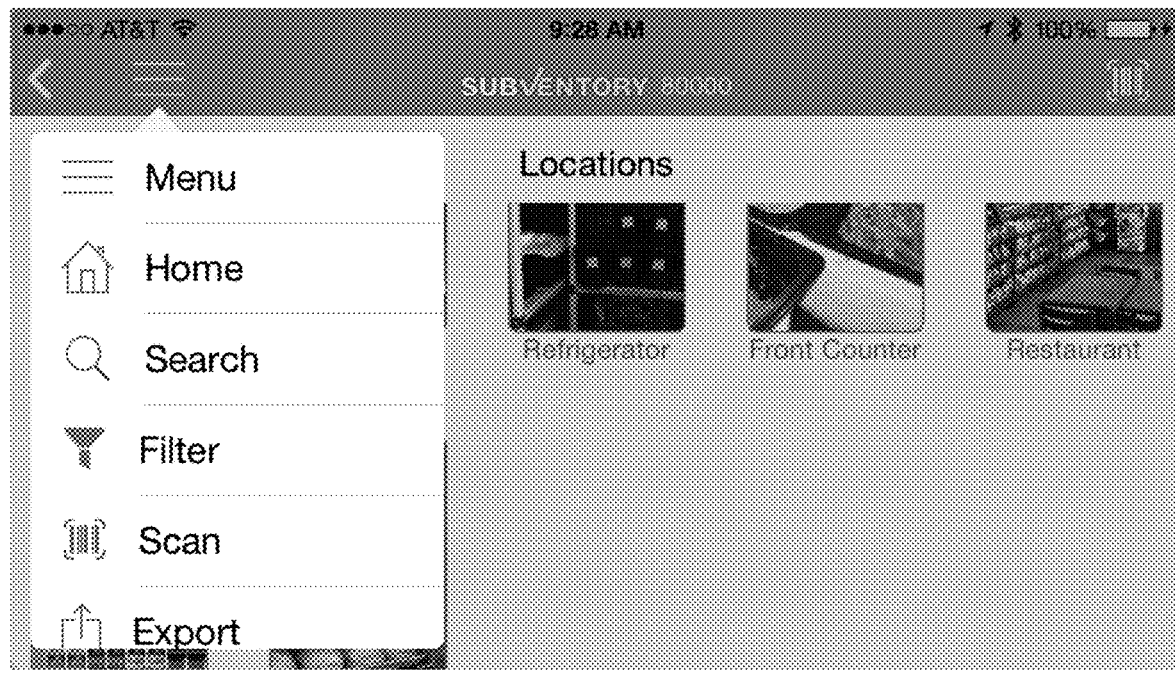
FIG. 8B is a screen shot showing an exemplary page including an actions menu, which may include a plurality of actions that may be selected, e.g., based on the icon and associated task selected from the main menu. For example, in the exemplary actions menu shown, the actions include a) a Home icon, b) a Search icon, c) a Filter icon, d), a Scan icon, and e) an Export icon. The Home icon may be selected to return to the previous main menu. In addition or alternatively, the "<" icon may be selected to return to the previous main menu, e.g., as a shortcut instead of having to select the actions menu icon and then select Home from the actions menu.
Figure 8C:
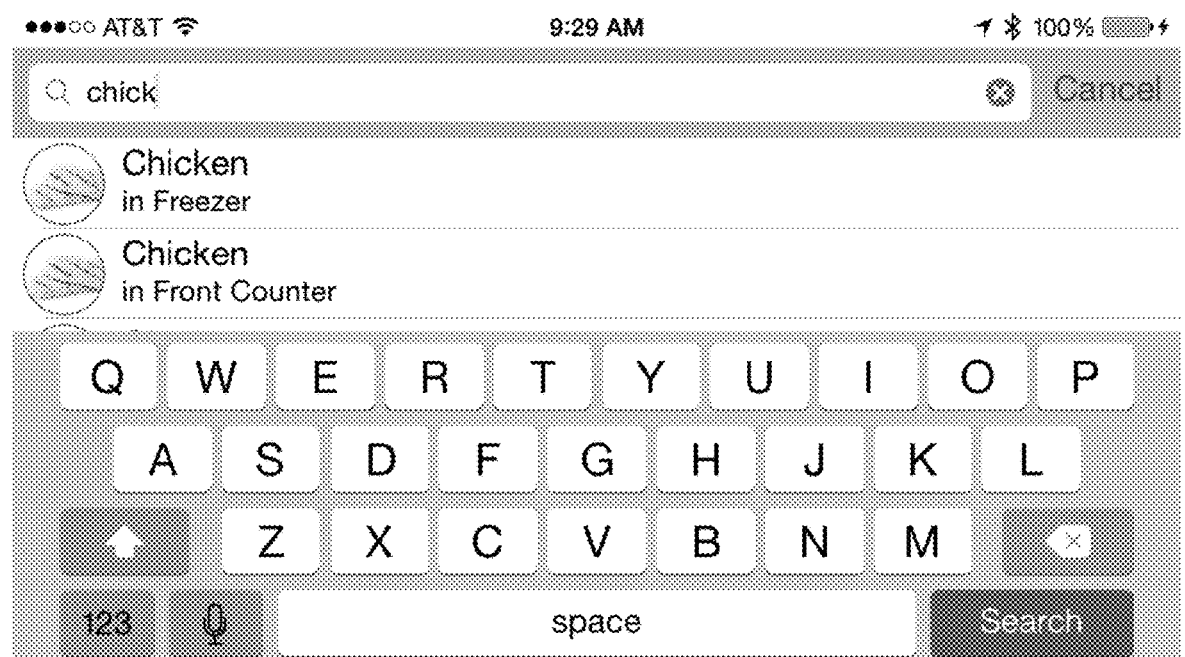
FIG. 8C shows a screen shot showing an exemplary Search page that may be presented when the "Search" icon is selected from the actions menu. The search page may allow a user to enter a query including search terms to create an inventory or report satisfying the query. For example, as shown, the user has entered "chick" in the search field, and, in response, the inventory device has presented a list of food products on hand that has the letters "chick" as a prefix, e.g., including the food product and its storage location. Subsequently, the user may select a row from the list, e.g., to obtain inventory information for the identified item at the associated storage location. For example, the user may be able to complete such a search to determine how much chicken is on-hand generally, frozen in the freezer, at the front counter where employees are preparing food products, and the like. Such information may be useful for planning purposes, e.g., before an anticipated rush, when planning for a new special being launched, and the like, to ensure that sufficient quantities of the selected item are readily available for the anticipated rush or special, e.g., thawed and/or otherwise prepared if potentially needed immediately, or frozen for later use.
Figure 8D:
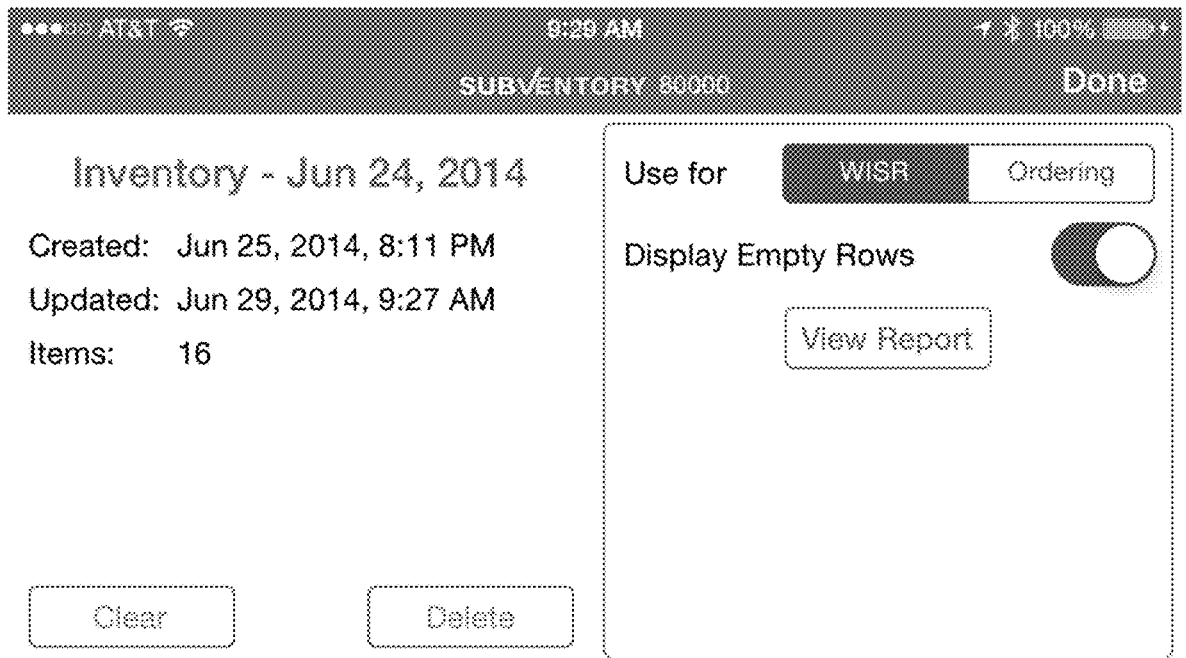
FIGS. 8D and 8E are screen shots showing exemplary Export pages that may be presented on the inventory device when the user selects "Export" from the actions menu of FIG. 8B. For example.
Figure 8E:
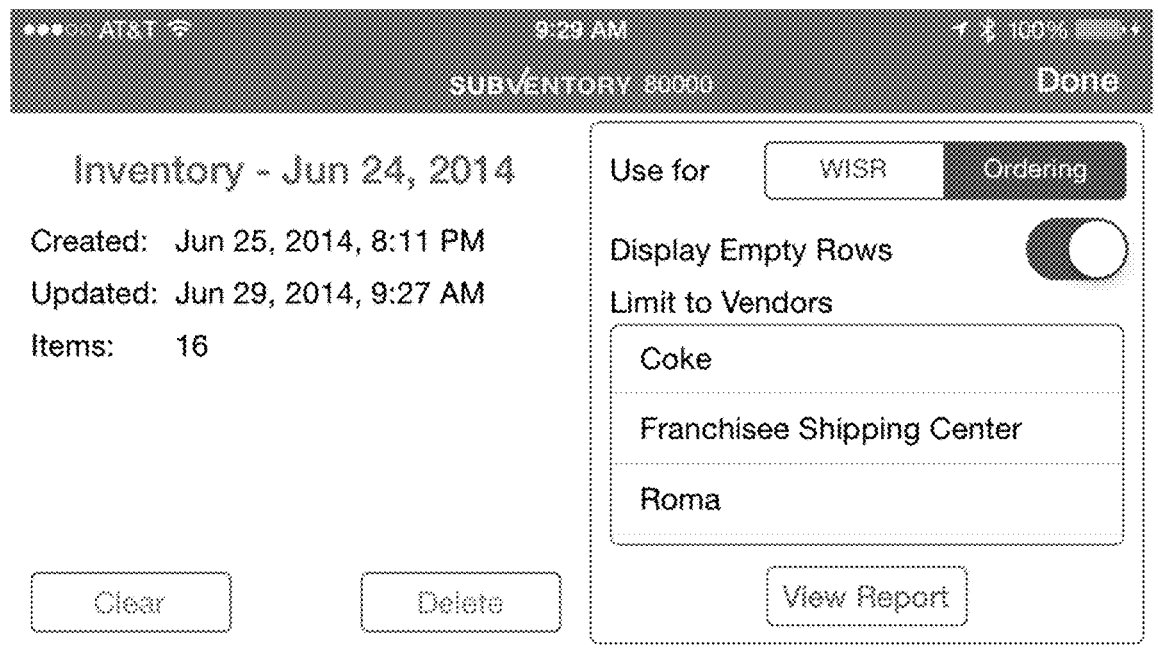

FIG. 8F shows a screen shot of an exemplary report that may be presented on the inventory device when a report is selected, e.g., from the Export pages shown in FIGS. 8D and 8E, or other menus described herein. FIG. 8G shows a detail of the report of FIG. 8F, e.g., which may be presented when the user zooms in on a portion of the report. For example, the report may allow the user to zoom in and/or outer of desired portions of the report, to scroll up or down, and/or perform other actions to facilitate review.

Figure 8H:
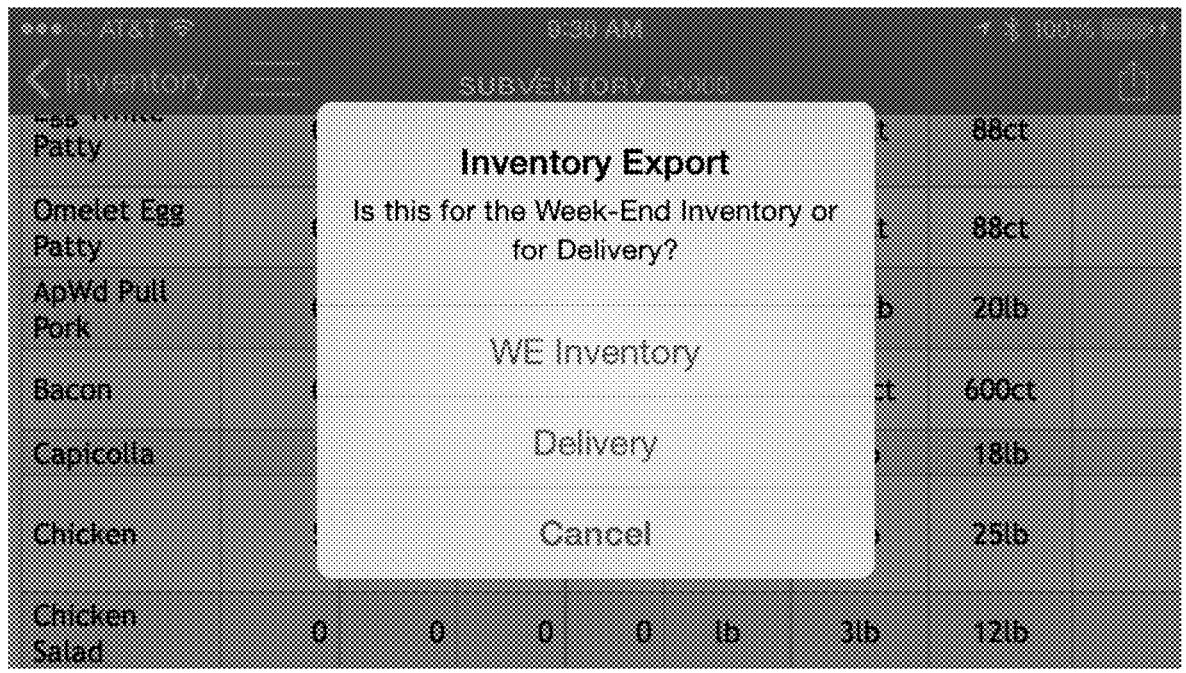

FIG. 8H shows a screen shot of an exemplary Export menu that may be present on the display of the inventory device, e.g., after selecting an Export icon from the report page. For example, as shown in FIGS. 8F and 8G, the report page may include a bar above or otherwise adjacent the report including the actions menu and the Export icon. When the Export icon is selected, the inventory device may prompt the user to identify the type of inventory information being exported, e.g., a week-end or other inventory of stock on hand, an inventory of products received in a delivery, and the like. Alternatively, if the user does not want to export the report, the user may select a "Cancel" icon from the Export menu.

Figure 8I:
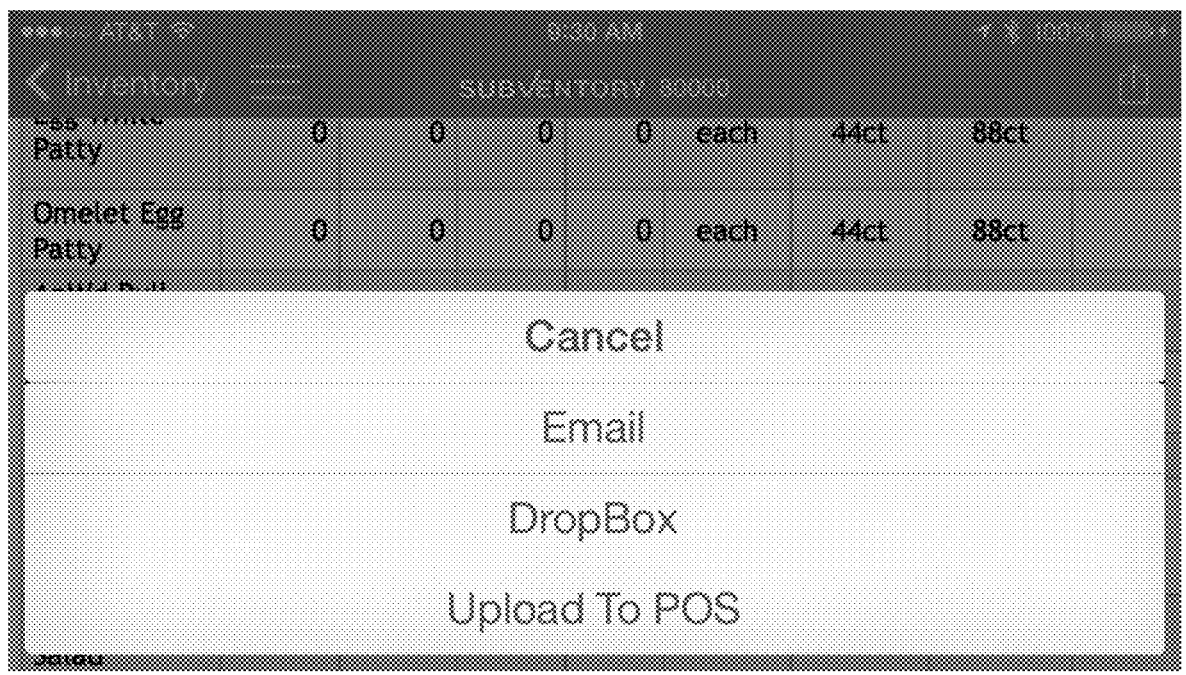

FIG. 8I shows a screen shot of an exemplary Export Confirmation menu that may be presented on the display of the inventory device, e.g., after selecting the Export icon from the Report (or other) page. Optionally, the Export Confirmation menu may include a plurality of options for sending the report, e.g., as an e-mail attachment to one or more recipients (e.g., by selecting the "E-mail" option), to a DropBox or other cloud-based destination, e.g., to the administrator server 12 (e.g., by selecting the "DropBox" option), or to the location register 20 (e.g., by selecting the "Upload to POS" option). The report may then be converted into a data file having a desired format, if necessary, and communicated, e.g., via the network 10, to the intended destination.

Figure 9A:
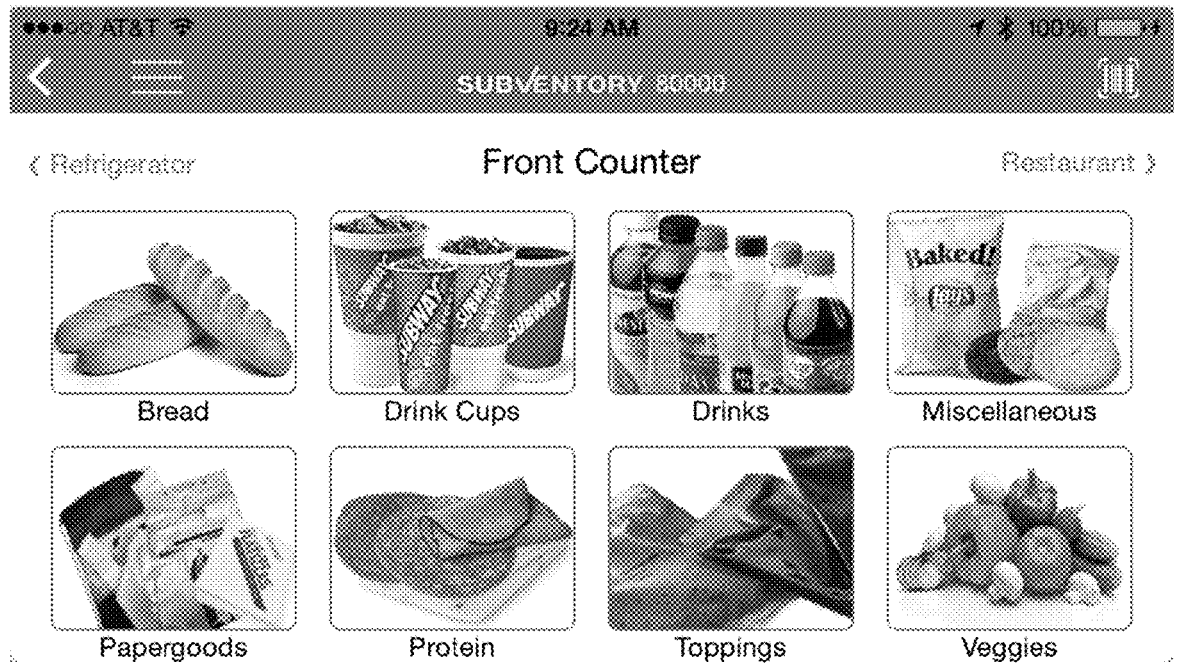

FIG. 9A is a screen shot showing an exemplary Category menu that may be presented on the display of the inventory device, e.g., when conducting an inventory, conducting a search or review of items for a store, and the like. As shown, the user may scroll through a sequence of Category menus for different storage locations of the store, e.g., by swiping left or right on a touchscreen.

Figure 9B:
Figure 9C:
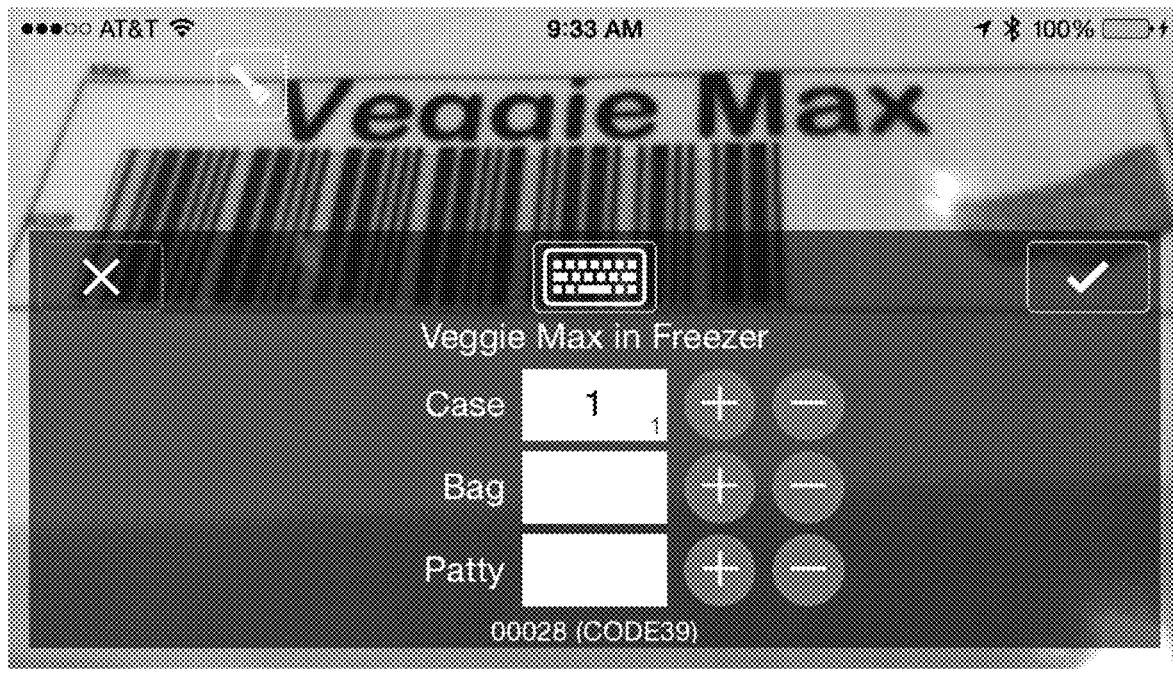

FIGS. 9B and 9C are screen shots showing exemplary images and menus that may be presented on the display when a scanner module of the inventory device is activated. The scanner module may use a camera of the inventory device to take an image and/or otherwise analyze a label. For example, in FIG. 9B, during a Search, a Scan icon may be selected to activate the scanner module and scan a label associated with a specific item to provide information regarding the item within the store. For example, the scanner module may be used in this manner to identify total quantities of the specific item on hand and/or at one or more storage locations within the store.

In addition or alternatively, as shown in FIG. 9C, during an inventory, after selecting a storage location were the user is, the user may scan a label of a package, a label mounted at the storage location where a specific item is intended to be stored, and the like, whereupon a Quantity menu may be presented on the display. The user may then enter quantities into the Quantity menu as they count the quantity of the item at the storage location.

Figure 9D:

Optionally, as shown in FIG. 9D, when the scanner module is activated, a scrolling menu may be presented, which may allow the user to scroll to desired items, e.g., based on scanning a label identifying a category. The user may select an item from the scrolling menu, whereupon a Quantity menu may be presented, e.g., similar to FIG. 9C, allowing the user to enter the quantities for the selected item.

Figure 10A:
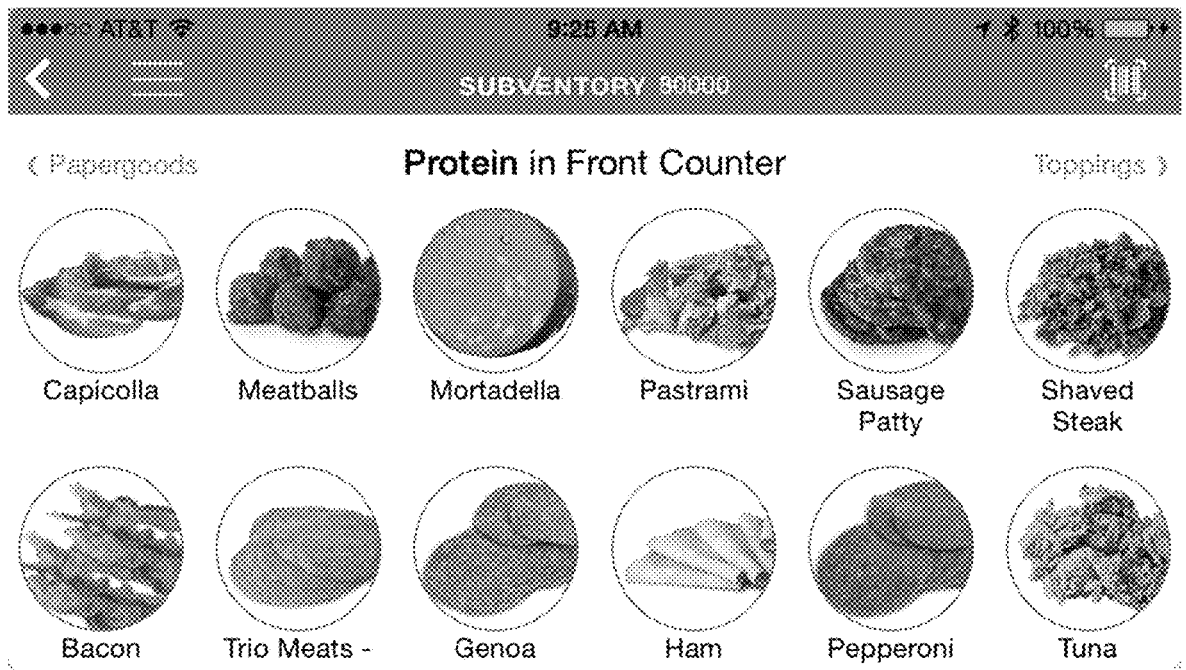

FIG. 10A is a screen shot showing an exemplary Items menu including available items within the selected category, e.g., when conducting an inventory, conducting a search or review of items for a store, and the like. As shown, the user may scroll through a sequence of Item menus for categories of food products and/or supplies of the store, e.g., by swiping left or right on a touchscreen.

As shown, the Items menu may include a header adjacent the item fields, e.g., displaying information regarding the storage location associated with the current Items menu and/or including one or more icons or menus, allowing the user to perform one or more actions. For example, the header may include a Scan icon, which may activate the scanner module and allow the user to scan one or more labels, as described elsewhere herein.

In addition, the header may include a Back or "<" icon, e.g., to return from the current Items menu to the Locations menu, e.g., to change the current storage location. In addition, the header may include an Actions menu icon, which may be selected to present the Actions menu (e.g., as shown in FIG. 8B).

Figure 10B:
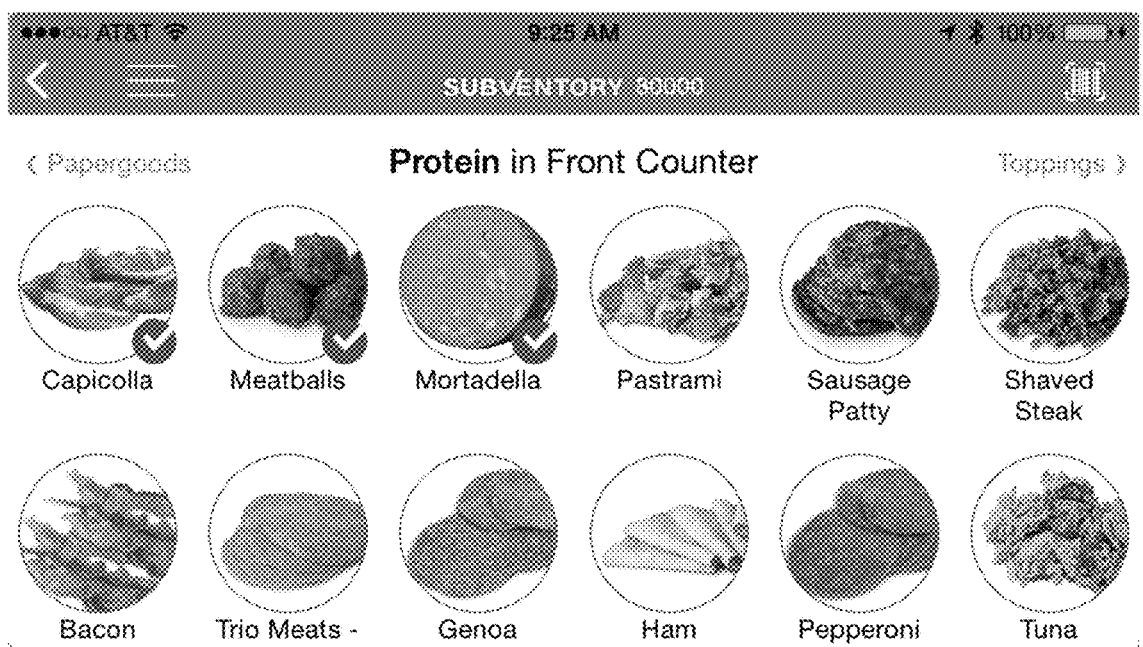

FIG. 10B is a screen shot of an exemplary Items menu that may be presented on the display during an inventory to provide confirmation that individual items within the displayed category and stored at the current storage location have been inventoried. For example, the user may select an Item icon from the Items menu in FIG. 10A, enter quantities for the selected item, and then return back the Item menu. Upon completing this action, the item icon may include a visual indication that the quantities have been entered, e.g., a "checkmark" as shown in FIG. 10B for Capicolla, Meatballs, and Mortadella. Thus, in the example shown in FIG. 10B, during the current inventory, the Capicolla, Meatballs, and Mortadella protein items have had quantities entered, while the remaining protein items have not.

Figure 10C:
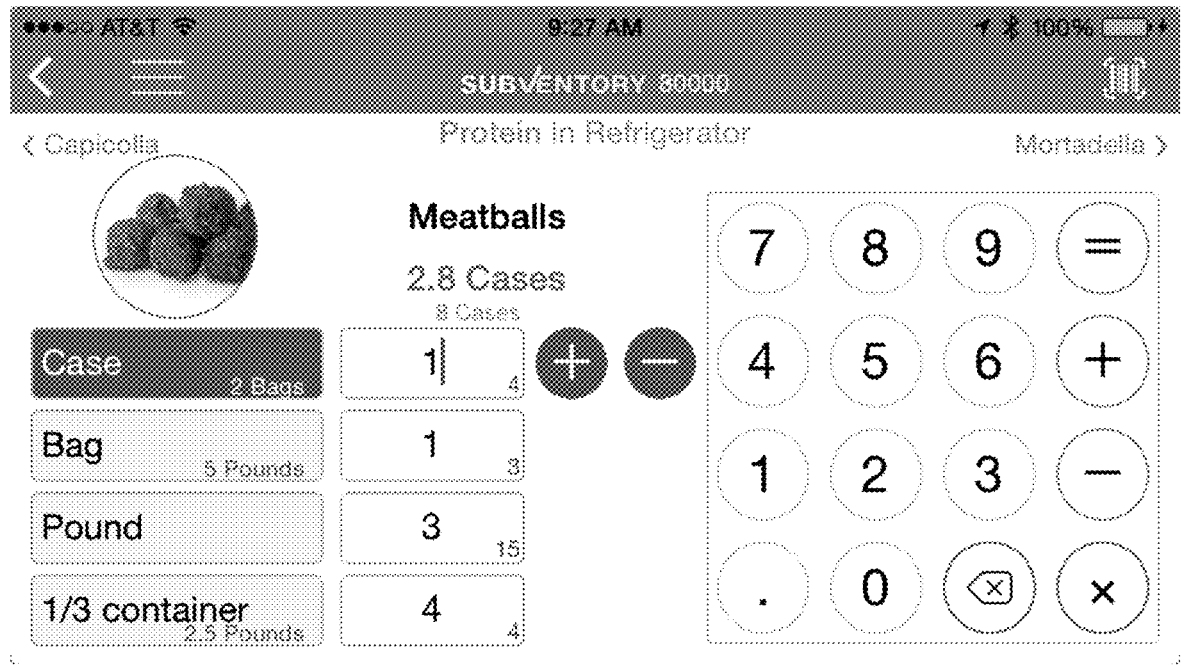
Figure 10D:
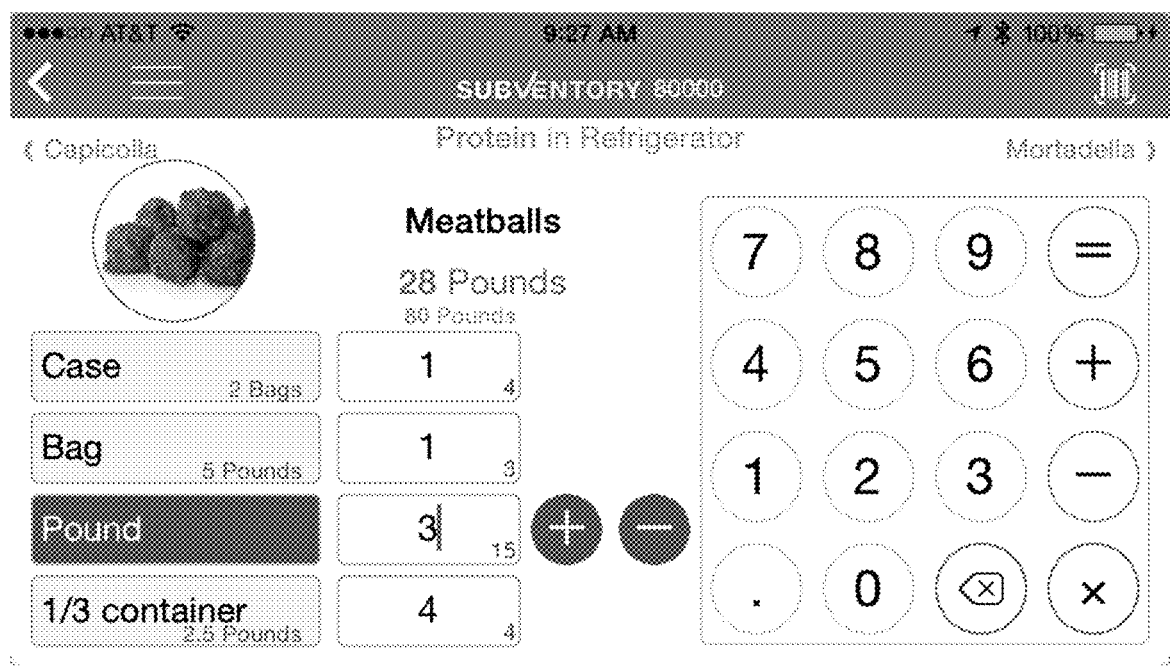

FIGS. 10C and 10D are screen shots showing exemplary Quantity menus that may be presented on the display, e.g., to allow the user to enter quantities of the selected item at the current storage location, e.g., when individual items are selected from the Items menu, as shown in FIGS. 10A and 10B.

FIGS. 11A-11D are screen shots showing exemplary portrait views of pages similar to those shown in FIGS. 6A-7B, respectively.

Figure 7A:
FIG. 7A is a screen shot showing an exemplary main menu that may be presented on an inventory device when a menu icon is selected, e.g., from the initial screen shot of FIG. 6A or from other inventory pages. In an exemplary embodiment, the main menu may allow a user to select from a plurality of tasks, e.g., a) create or access an inventory action, b) search or analyze ingredients, c) search or analyze containers/bottles, d) obtain support information, e) select a store from available stores, and f) modify settings of the application.
Figure 7B:
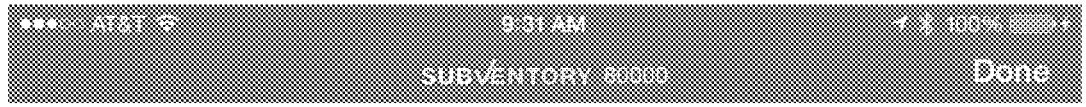
FIG. 7B is a screen shot showing an exemplary Store List page that may be presented, e.g., when the user selects the "Select Store" icon from the main menu of FIG. 7A. When selected, the page may present a list of available stores, e.g., associated with the user and/or to which the user is authorized to access information. For example, when an individual store is selected, that store's information and/or default settings (e.g., storage locations, food products, and the like) may be applied to subsequent actions until a different store is selected. For example, if the main menu is opened and the "Inventory" icon selected, a page similar to the inventory action list shown in FIG. 6A may be presented on the inventory device that includes only inventory actions for the selected store. Similarly, if the user selects the "Ingredients" or "Containers/Bottles" icons, the user may be able to search inventory and/or generate reports for the selected store.
Figure 11A:
Figure 11A:
Figure 11A:
Figure 11A:
Figure 11A:
Figure 11A:
Figure 11A:
Figure 11A:
Figure 11B:
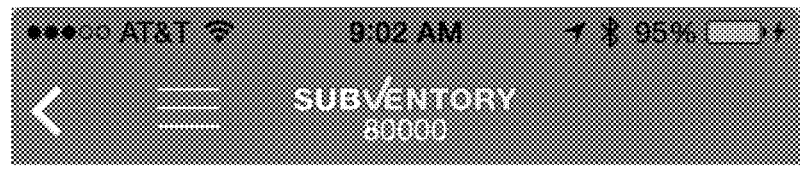
Figure 11C:
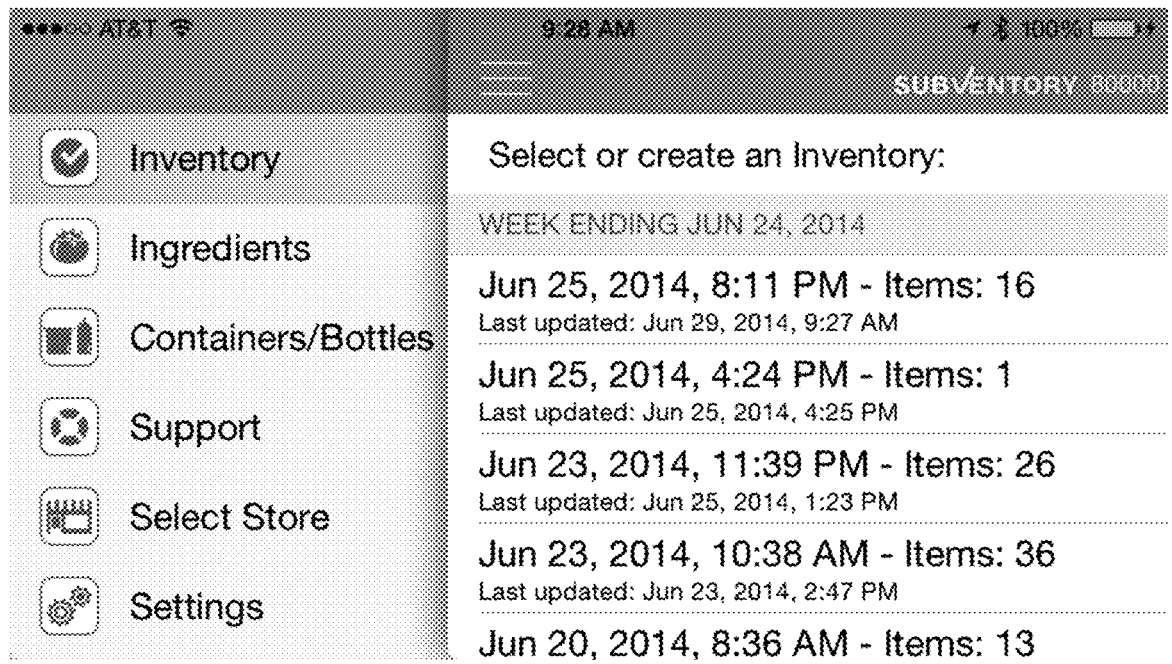
Figure 11D:
Figure 11D:
Figure 11G:
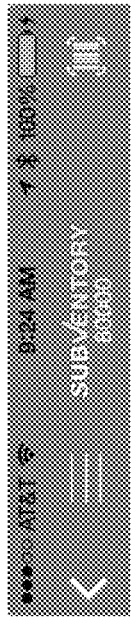

FIGS. 11E-11G are screen shots showing an exemplary Settings page that may be presented on the display when the Settings icon or field is selected from the Actions menu, e.g., shown in FIGS. 7A and 11C. For example, the Settings page may be a single page including all of the options shown in FIGS. 11E-11G in a list and the user may scroll up and down through the list to review and/or change settings, as desired. Alternatively, the settings options may be presented on separate pages that may be toggled through using the interface of the inventory device. The Settings page may allow the user to set and/or change a variety of settings of the application, e.g., to save an Export destination for reports, set parameters of the scanner module, and the like.

Figure 12A:
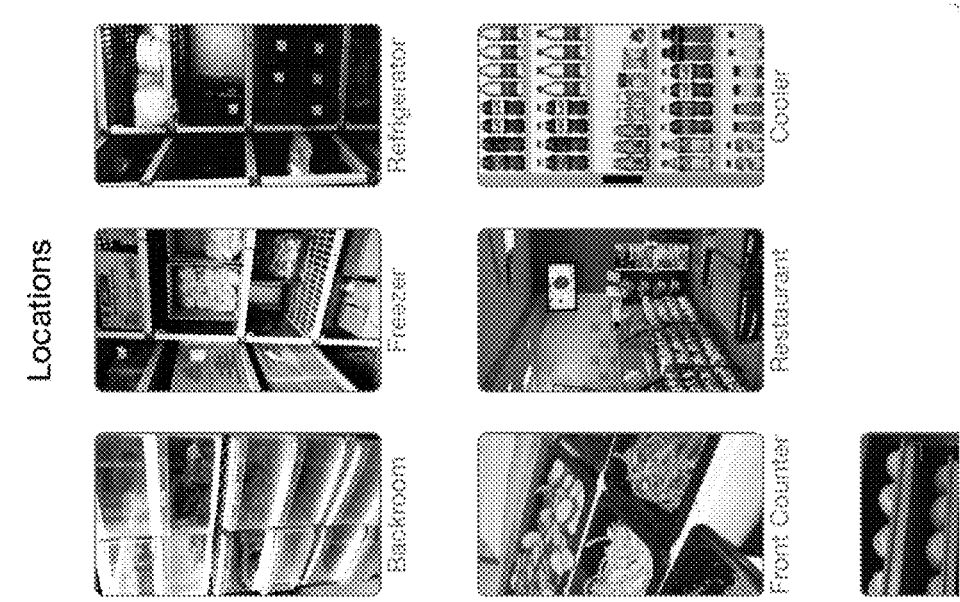
Figure 12C:
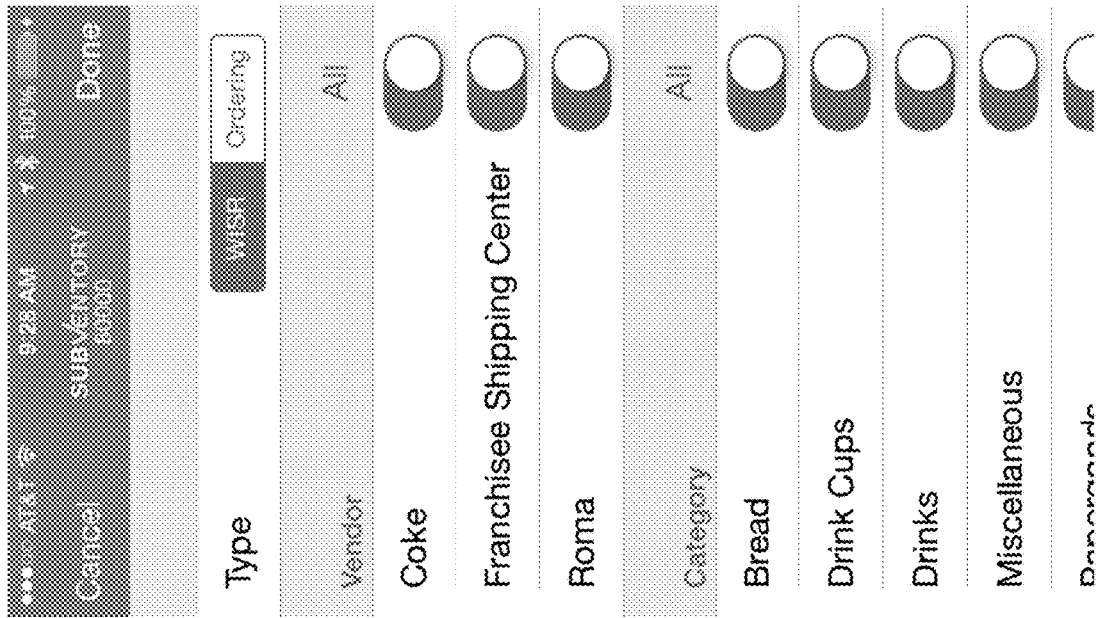
Figure 12B:
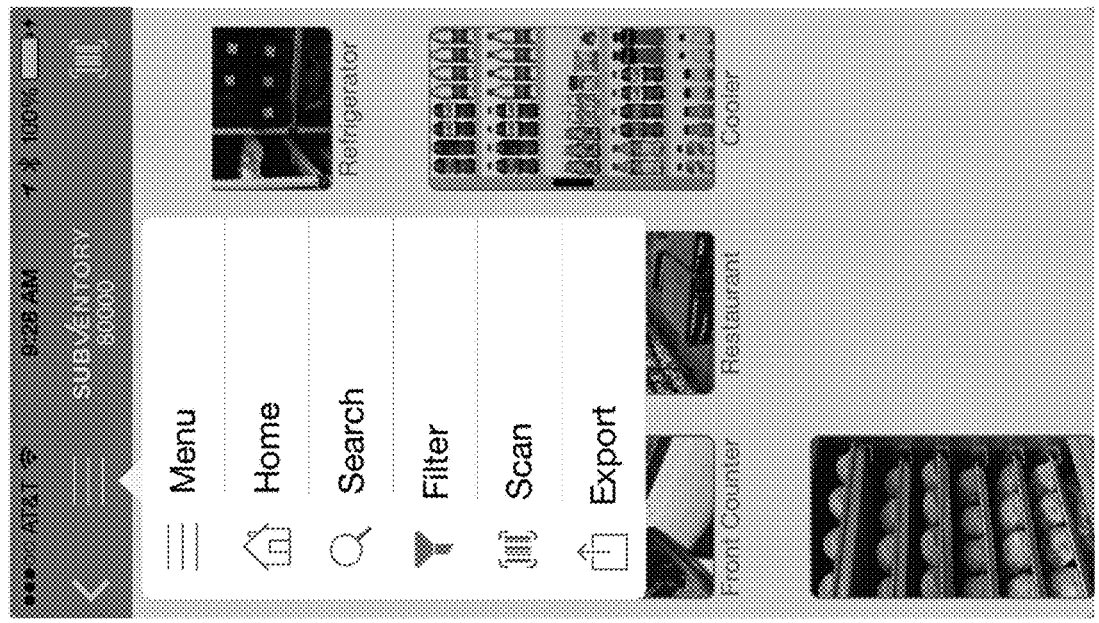

FIGS. 12A and 12B are screen shots showing portrait views of pages similar to those shown in FIGS. 8A and 8B, respectively.

FIG. 12C is a screen shot showing an exemplary Filter page that may be presented on the display when the Filter icon or field is selected from the Actions menu, e.g., as shown in FIG. 12B. The Filter page may include a list or other menu of Vendors, Categories, and the like, that may be selected to include or exclude the identified vendors, categories, and the like in an inventory action, search, and the like. For example, when conducting a limited inventory, certain categories may be excluded (e.g., if the default setting is that all categories are included) such that a limited inventory may be conducted for the included categories. Similarly, individual vendors may be selected from the Vendor list, e.g., to exclude or include the selected vendors in an inventory action. Optionally, such filters may also be used to place orders and/or plan future orders, e.g., by including only desired vendors, categories, and the like to generate reports regarding current stock or history.

Figure 12E:
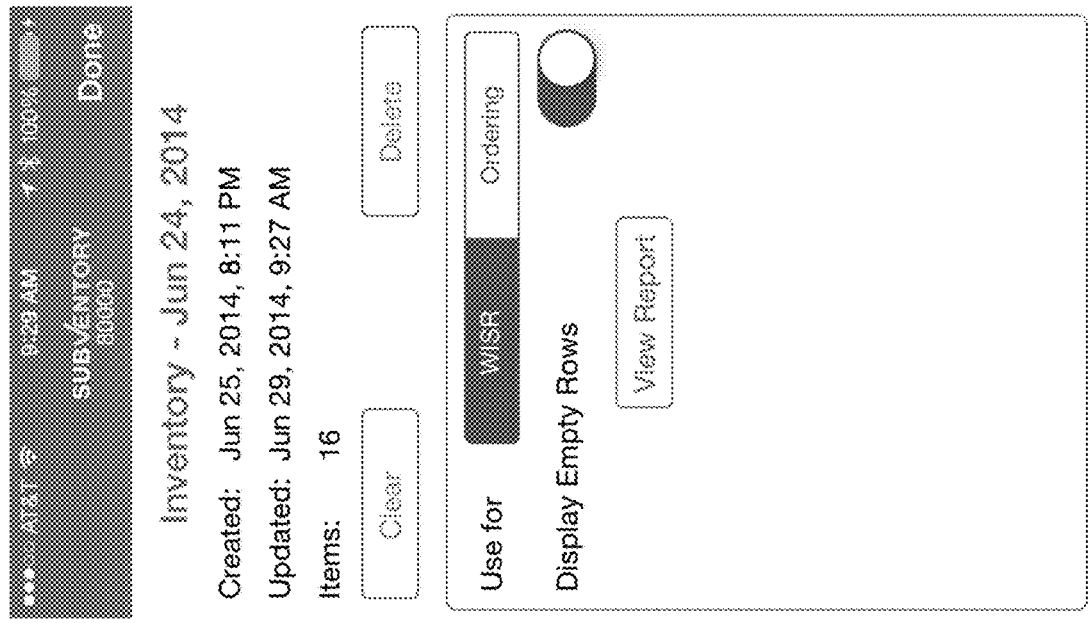
Figure 12D:
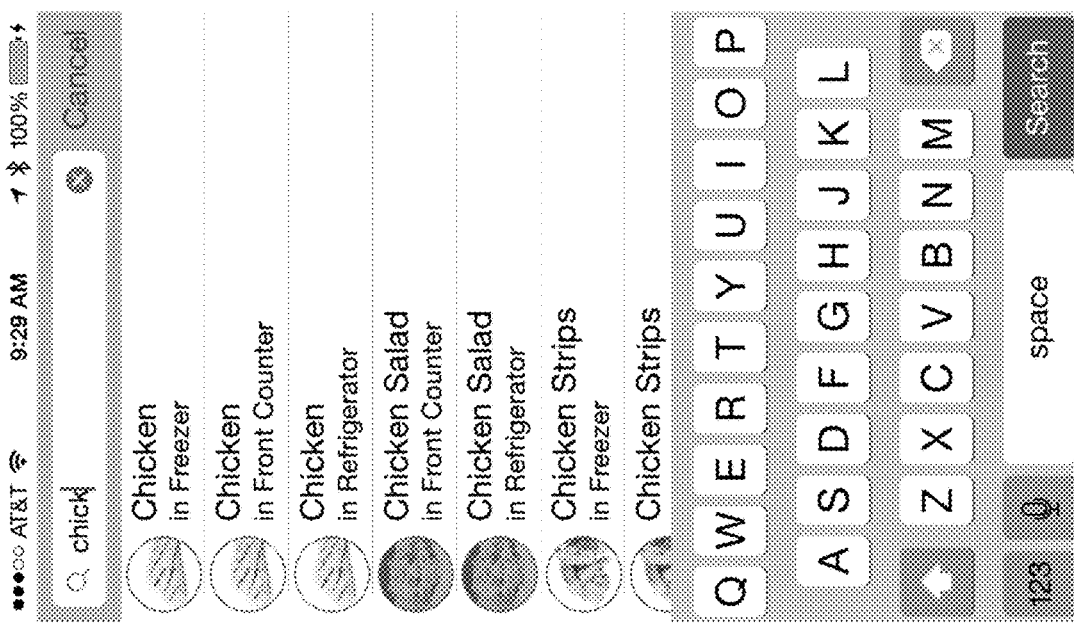

FIG. 12D is a screen shot showing an exemplary portrait view of a Search page that may be presented on the display, e.g., similar to the Search page shown in FIG. 8C.

Figures 12F, 12G:
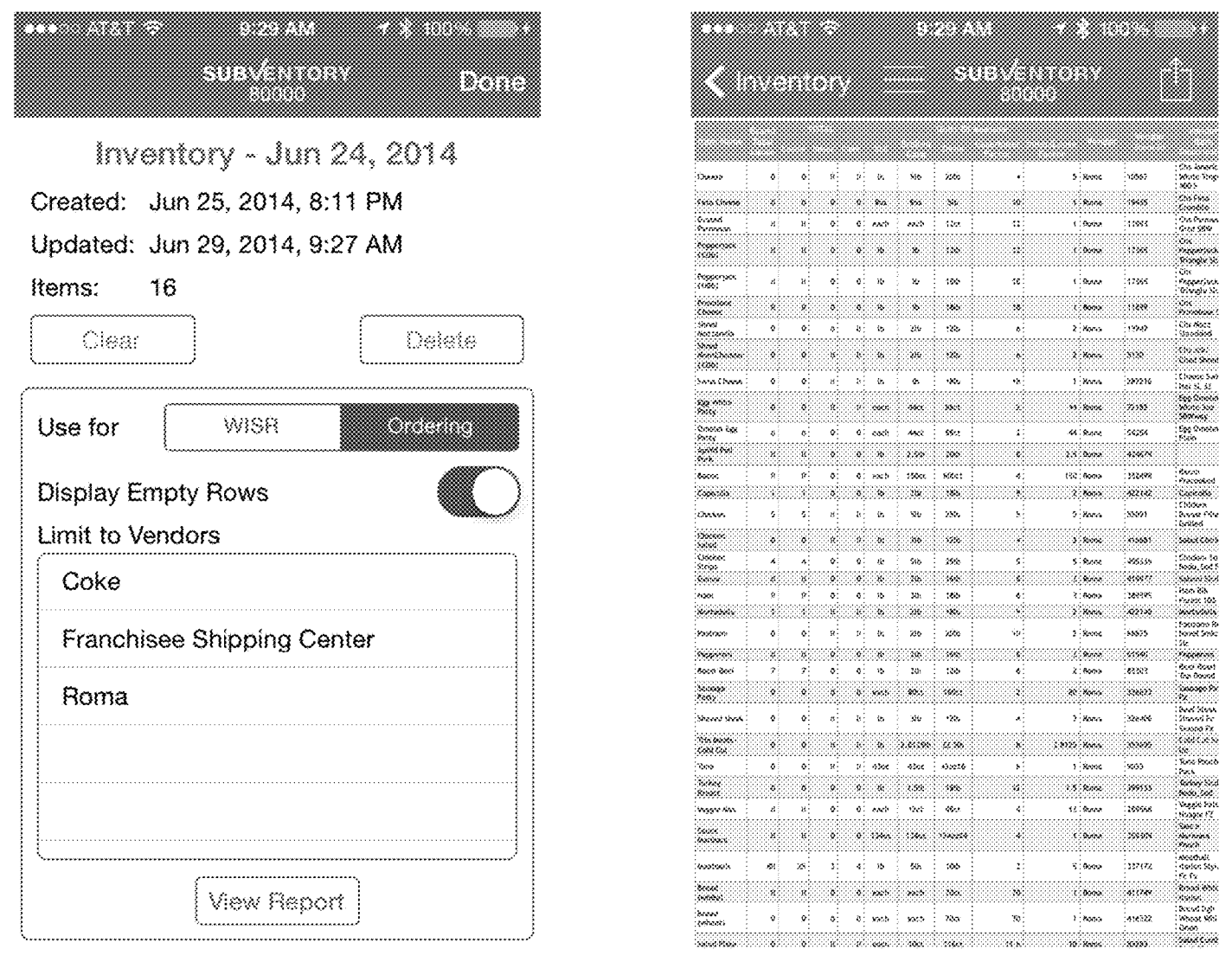

FIGS. 12E and 12F are screen shots showing exemplary portrait views of Export pages that may be presented on the display, e.g., an inventory page and an ordering page, similar to the Export pages shown in FIGS. 8D and 8E.

FIGS. 12G-12J are screen shots showing exemplary portrait views of reports and Export pages that may be presented on the display, e.g., similar to the reports shown in FIGS. 8F-8I.

Figures 12J, 12K:
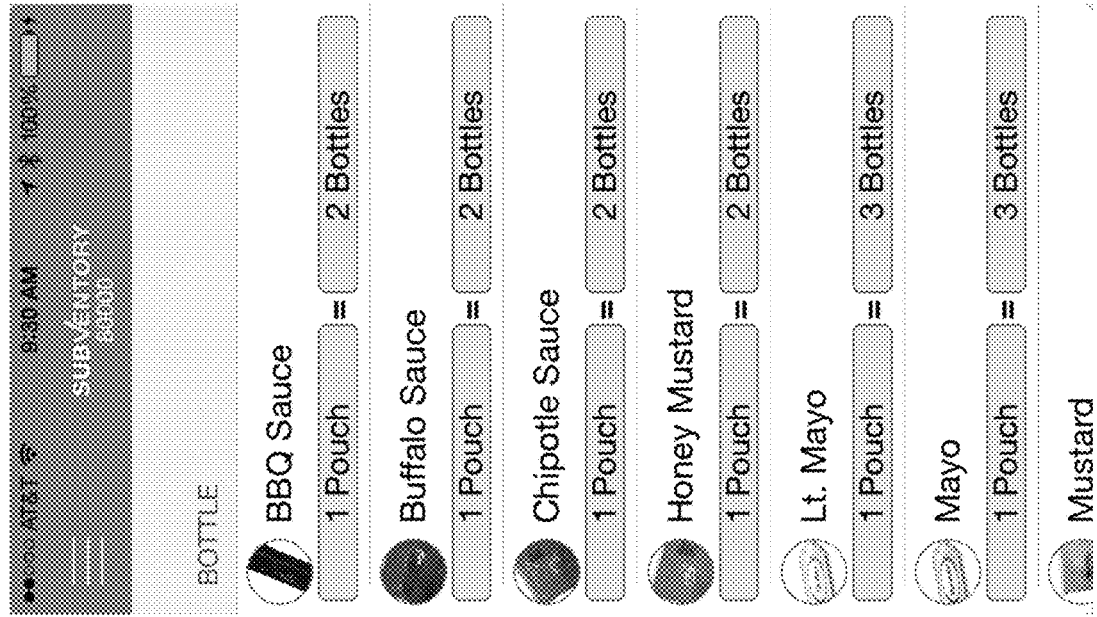
Figure 12M:
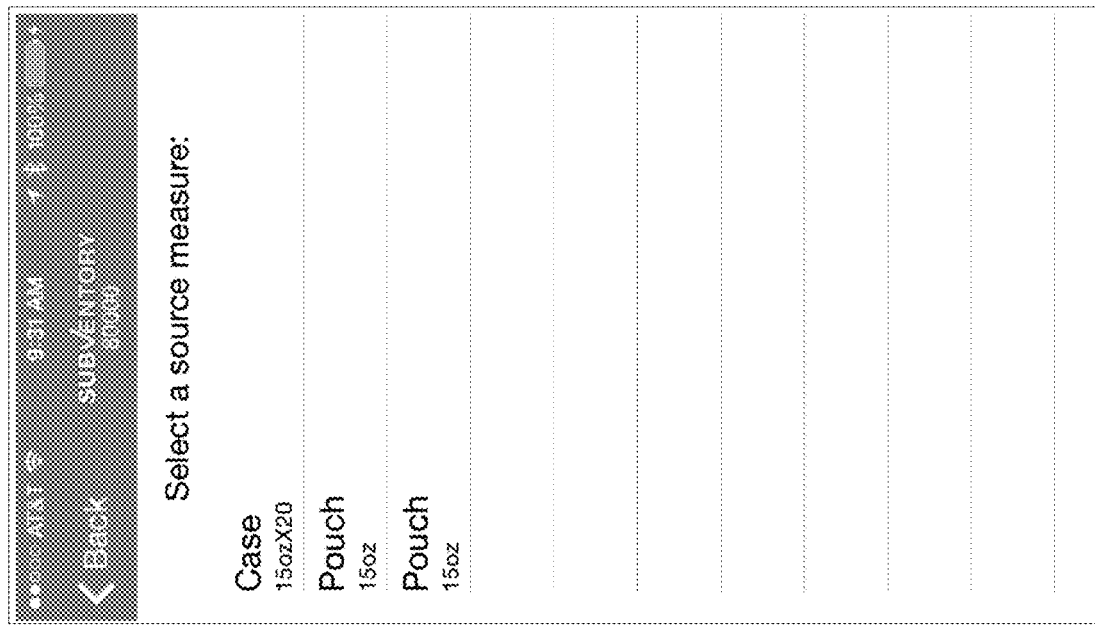
Figure 12L:
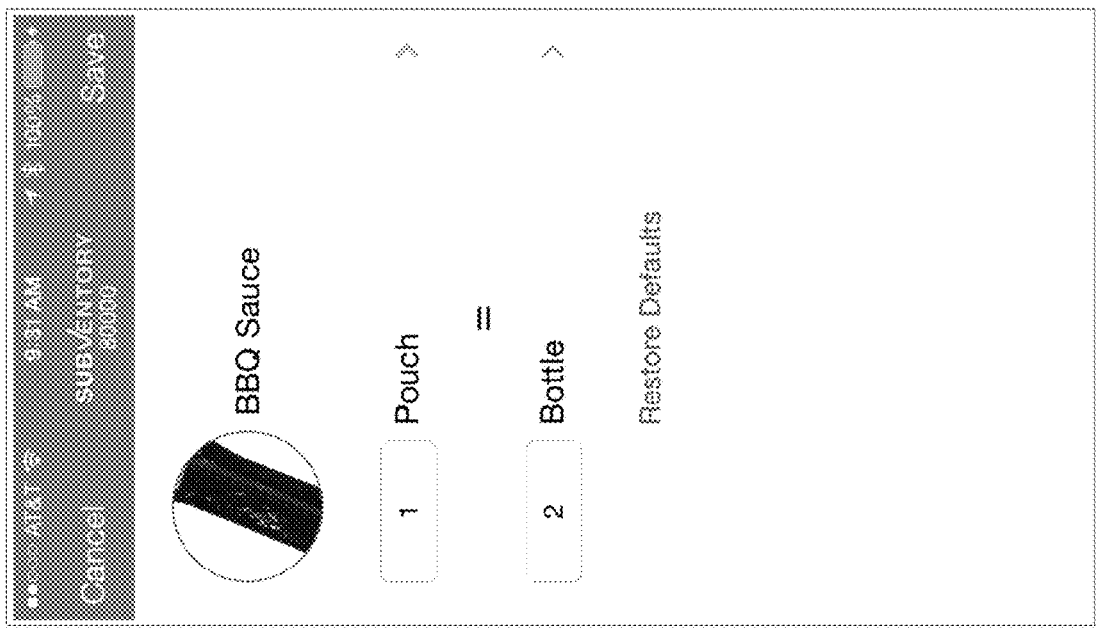

FIGS. 12K-12N are screen shots showing exemplary Bottle pages that may be presented on the display, which may include a list or other menu of condiments, toppings, and/or other supplies that may be stored in bottles or other containers. For example, as shown in FIG. 12K, individual condiments or toppings may be delivered in bulk containers, e.g., pouches, and individual bottles may be filled from the pouches and used to prepare food products that are sold. Optionally, the user may select one of the topping icons or fields, and a Conversion page may be presented on the display, e.g., as shown in FIG. 12L. The user may use the Conversion page to modify default conversions or reset conversions that have been previously modified to default settings. Similarly, FIGS. 12M and 12N may be used to set conversion rates for individual toppings, e.g., based on the size of a source container (e.g., a pouch or case including multiple pouches), and a target container (e.g., partial containers, bottles, bags, trays, and the like).

Figure 13A:
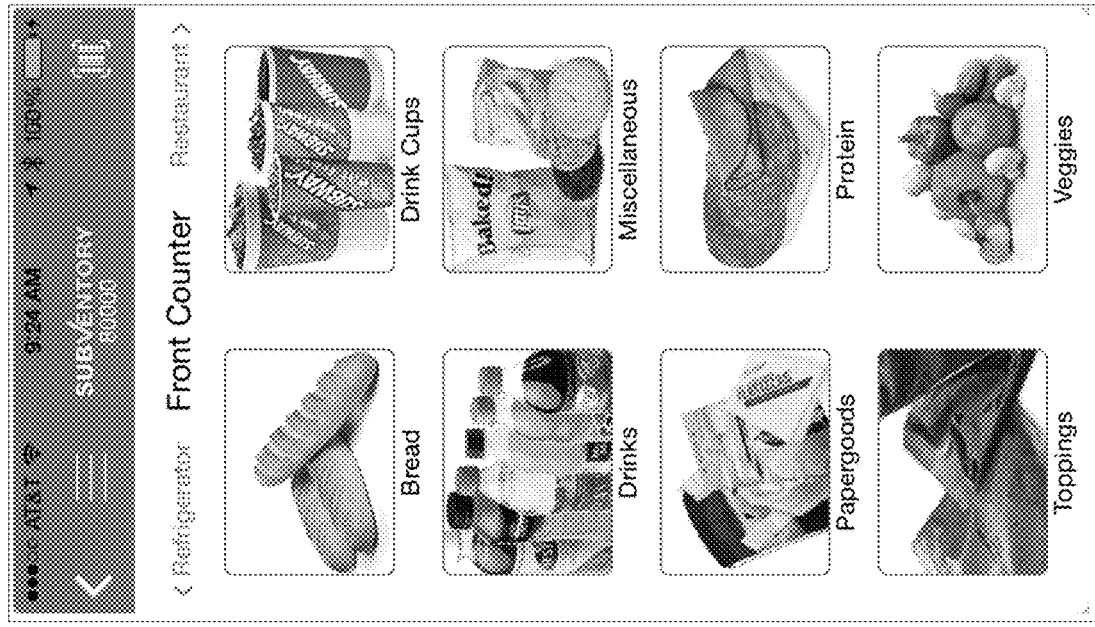
Figure 12N:
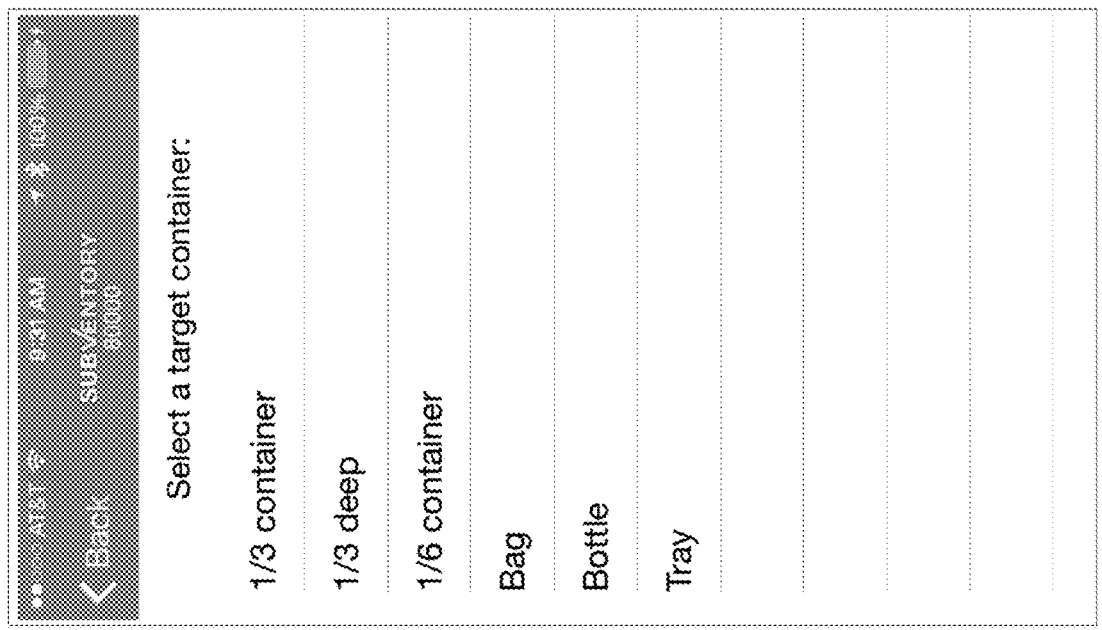
Figure 13C:
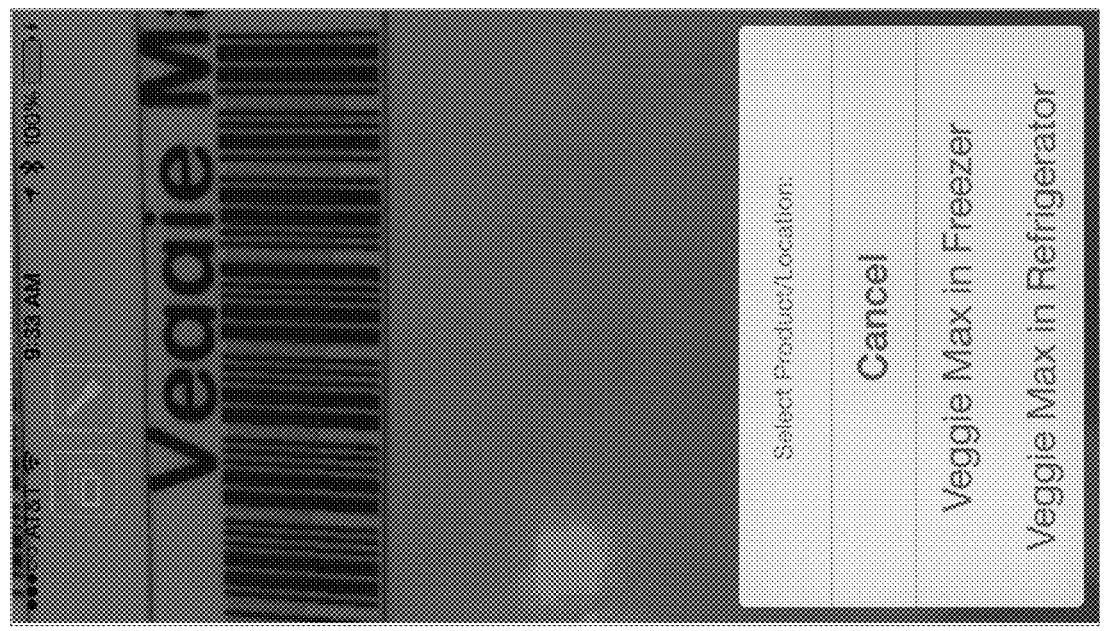
Figure 13B:
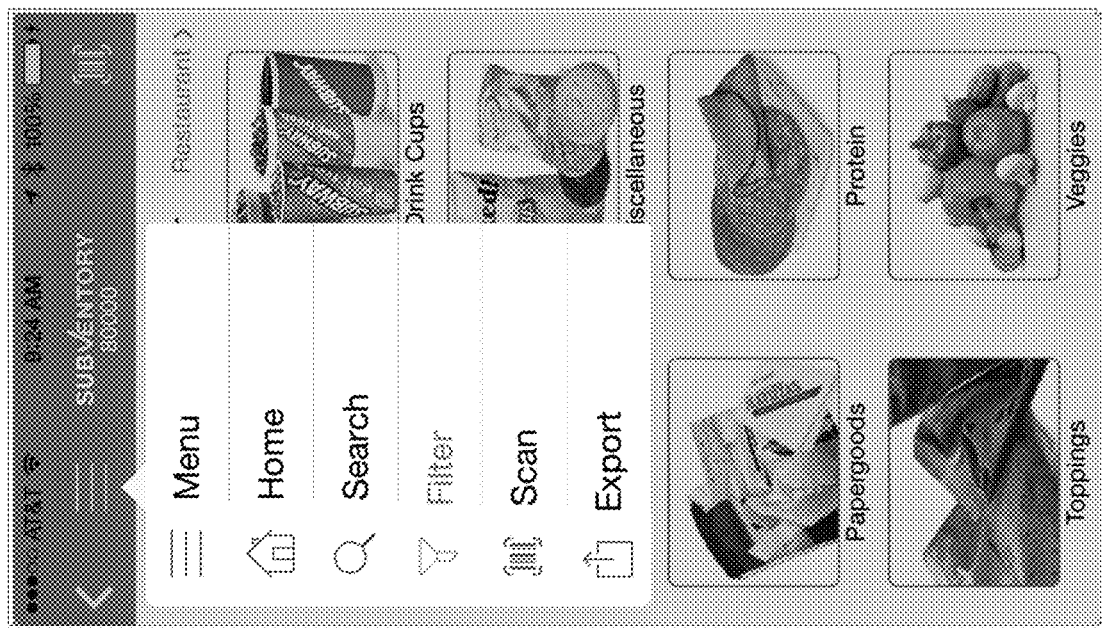
Figure 13E:
Figure 13D:
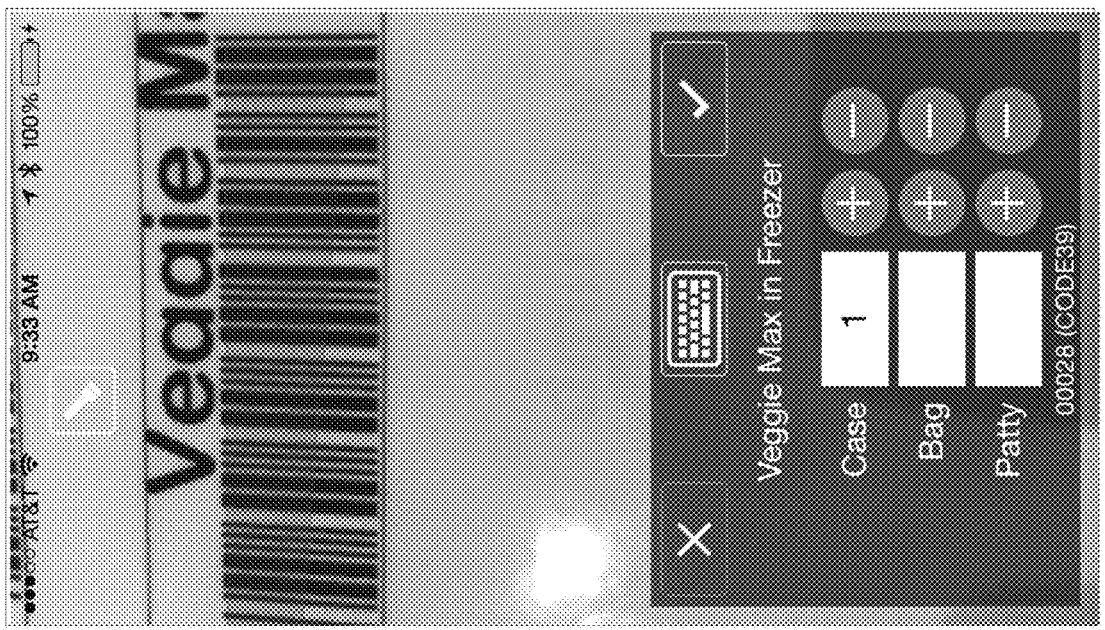

FIGS. 13A and 13B are screen shots showing exemplary portrait views pages including Category menus and Action menus, which may be presented on the display, similar to the pages shown in FIGS. 8A and 8B.

FIGS. 13C-13F are screen shots showing exemplary portrait views of an image generated using a scanner module and Quantity menu that may be presented on the display, similar to the pages shown in FIGS. 9B-9D.

Figure 14A:
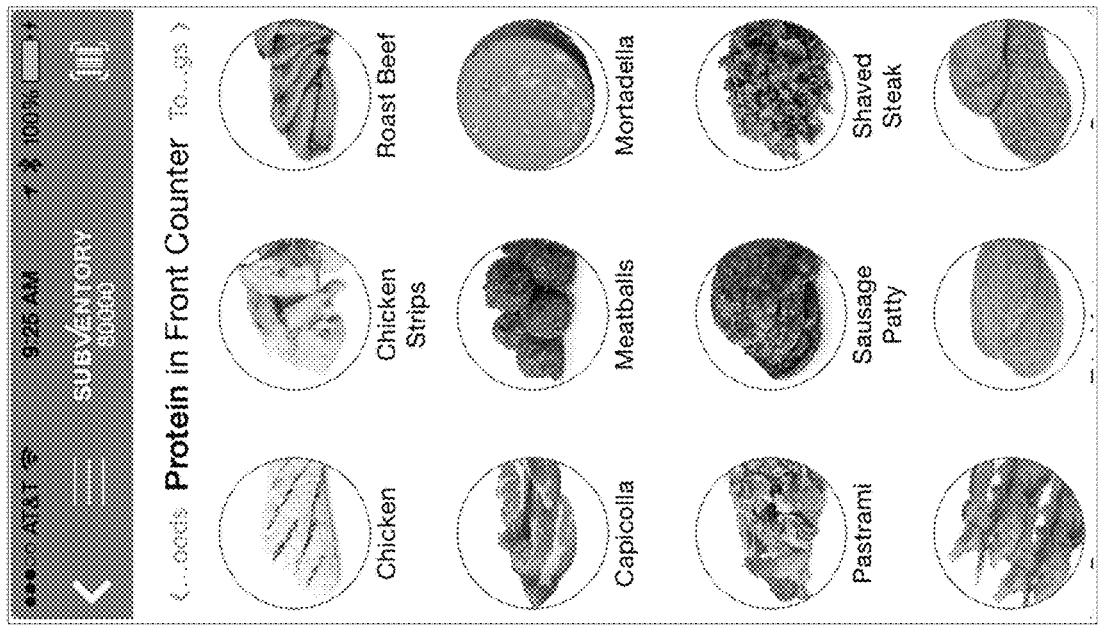
Figure 13F:
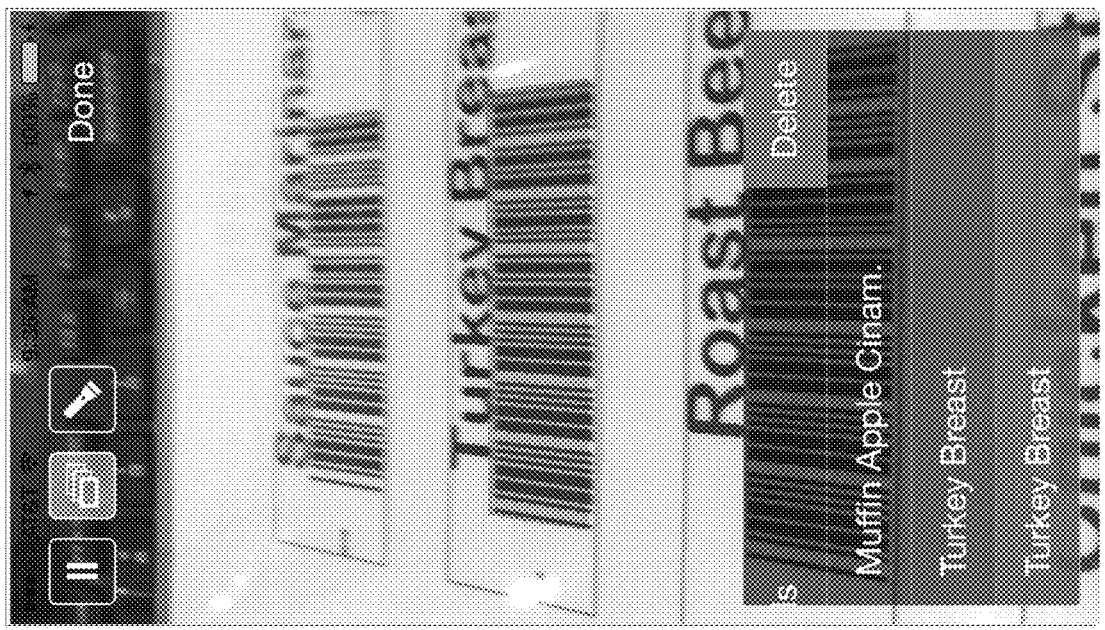
Figure 14B:
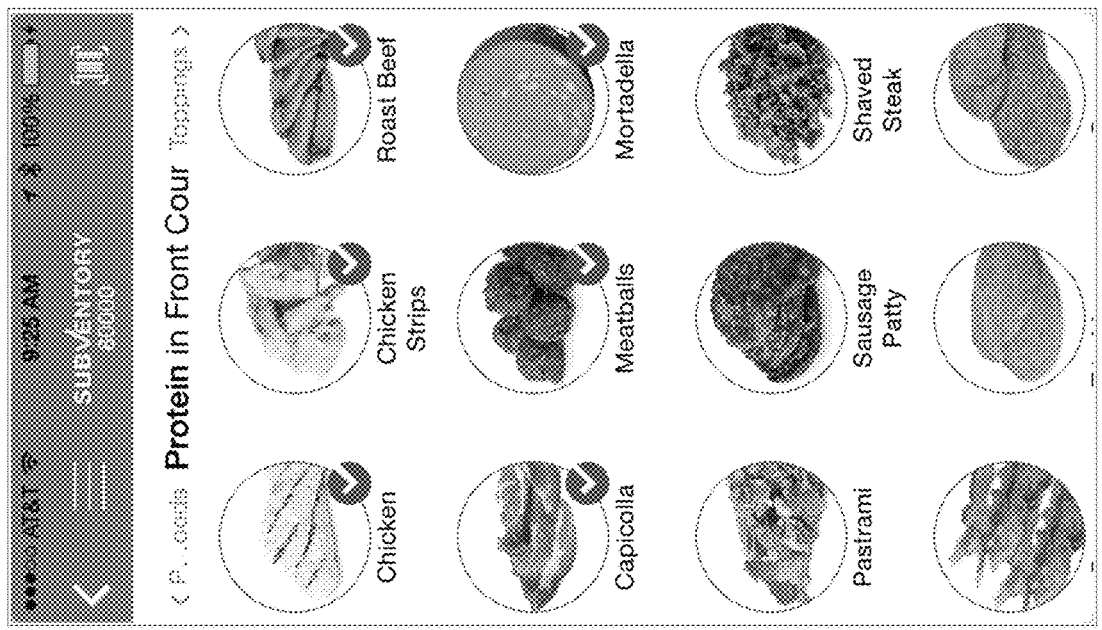

FIGS. 14A-14B are screen shots showing exemplary portrait views of Item menus that may be presented on the display, similar to the pages shown in FIGS. 10A-10B.

Figure 15A:
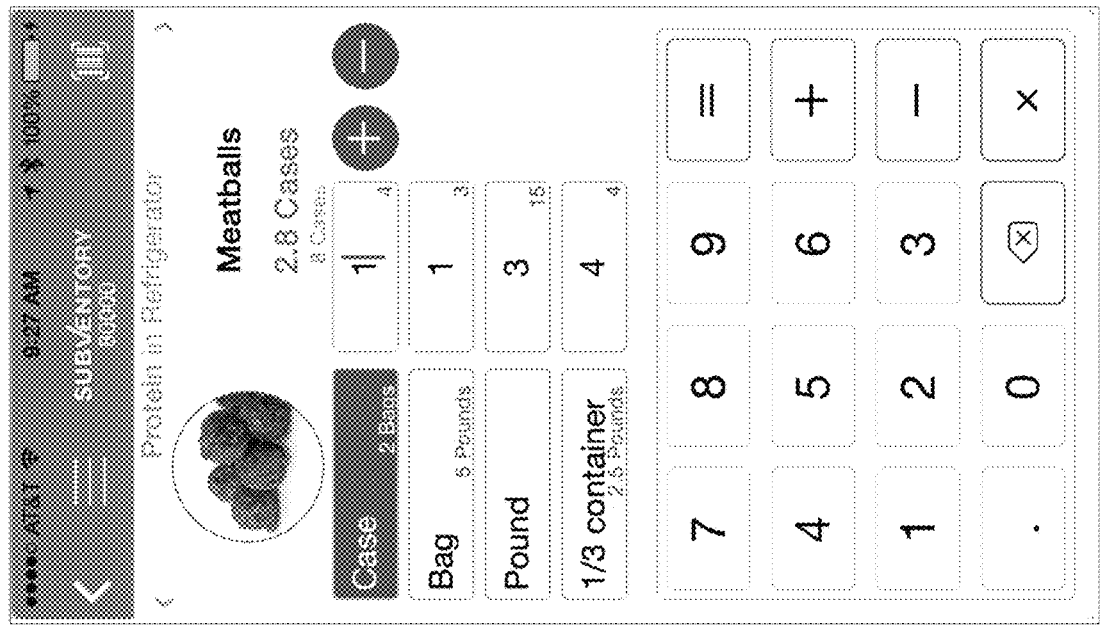
Figure 15C:
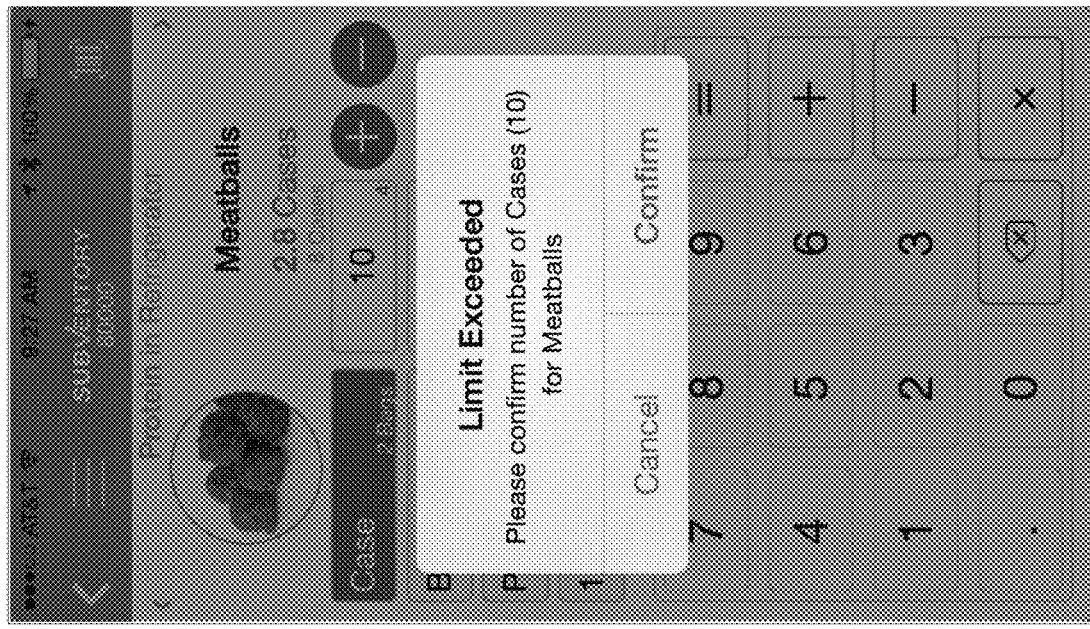
Figure 15B:
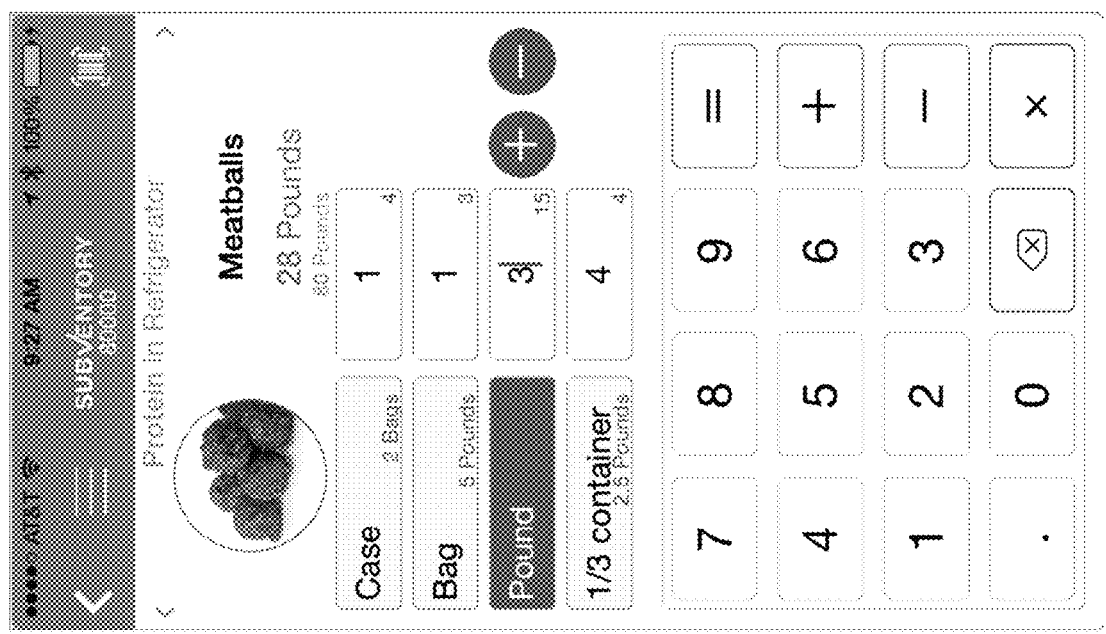

FIGS. 15A-15B are screen shots showing exemplary portrait views of a Quantity menu that may be presented on the display, similar to the pages shown in FIGS. 10C-10D.

FIG. 15C is a screen shot showing an exemplary Quantity page including a warning that an upper limit of quantity for the selected item has been entered. For example, the local database may include a default set of maximum quantities for each item that may be inventoried. Such an upper limit may be used to provide the warning shown in FIG. 15C, e.g., providing the user an opportunity to confirm that the quantity is correct and not a typographical or other error (e.g., accidentally entered 10 cases instead of 10 bags as actually identified).

DETAILED DESCRIPTION OF THE EXEMPLARY EMBODIMENTS

Turning to the drawings, FIG. 1 shows an exemplary embodiment of a system 8 for conducting inventories, e.g., via a network 10, such as a telecommunications network and/or the Internet. Although the systems and methods herein have particular utility for conducting inventories for restaurants, for example, to facilitate inventorying food ingredients, products, and/or other supplies for one or more restaurants, the systems and methods may be used for other businesses or facilities, e.g., in which various products are stored and/or used at multiple locations within the business or facility. For example, the systems and methods herein may also be used for manufacturing facilities to inventory components, subassemblies, and/or other products within a manufacturing location. In addition or alternatively, the systems and methods may be used to inventory, track, and/or monitor products from delivery to a location through sales and/or use of the products, e.g., to audit sales and/or use of products by the location, which may facilitate auditing for waste, theft, and/or other loss, and/or to project future orders for supplies.

As shown in FIG. 1, the system 8 generally includes one or more administrator servers 12 including an administrator database 14 for communicating and/or storing information related to one or more restaurants or other locations, one or more inventory electronic devices, such as electronic devices 18a, 18b, and a restaurant or location register (e.g., a POS register or other electronic device) 20 connected to and/or communicating via the network 10. Optionally, if the server 12 manages inventorying for multiple restaurants or locations, each location may include one or more location registers and/or inventory devices for conducting inventories of the respective locations (not shown for simplicity).

In exemplary embodiments, the network 10 may be a telecommunications network, including a wide area network ("WAN"), a local area network ("LAN"), an intranet, a wireless network, and/or a telephony network. For example, the network 10 may incorporate several different types of networks including a WAN, a LAN, and/or a wireless network; one such network including multiple different types of networks is the Internet.

Each inventory device 18 and location register 20 may be an electronic and/or computing device, such as a mobile, smart, and/or cellular telephone, a tablet computer, a personal digital assistant, a wi-fi device, a desktop computer, a laptop computer, and the like, capable of communicating via the network 10. For example, the location register 20 may be a stationary electronic device provided at the physical location, e.g., a cash register for conducting transactions at the front counter of a restaurant and/or for managing the restaurant. As described further below, the location register 20 may receive inventory information, e.g., from the inventory device(s) 18 via the administrative server 12, to generate reports and/or perform analyses based on the inventory information.

Each of the inventory devices 18 may be a portable or mobile device, which may be carried by an employee or other user throughout a restaurant or other location to conduct an inventory, e.g., by selecting storage locations, categories of food products and supplies, and/or individual product items, quantities, and the like, as described elsewhere herein. In an exemplary embodiment, the inventory devices 18 may be an iPhone®, Android®, or other smart phone device, or an iPad® or other tablet device, running a software application performing the various functions and features described herein.

Optionally, each inventory device 18 may including a case and/or securing features to allow the inventory device 18 to be removably secured to the user's arm. For example, the inventory device 18 may be placed in a case including one or more straps (not shown) that may be wrapped around and secured to the user's forearm, e.g., using hook and eye or other removable fasteners. Thus, the user may secure the inventory device 18 on one forearm to facilitate viewing and/or manipulating menus, accessing and/or entering information, and/or performing other functions using the other arm while moving about and/or completing an inventory. Such a device may provide greater mobility and/or facilitate accessing storage locations, packages or containers, and the like since the user may have both hands free, rather than having to hold the inventory device 18 in one hand or repeatedly set down and pick up the inventory device 18.

The administrator server 12 may include one or more computer systems including one or more processors, memory and/or storage devices, and communication interfaces (not shown) for communicating via the network 10, e.g., with the electronic devices 18, 20. The administrator server 12 may include one or more hardware-based components and/or software-based modules for performing the various functions related to the system 8, as described elsewhere herein. For example, the administrator server 12 may receive a completed or partial inventory from one or more inventory devices 18, e.g., consolidating information from multiple devices conducting an inventory, storing the information in the administrator database 14, and/or communicating the information and/or reports with the location register 20, also as described elsewhere herein.

As shown, the administrator server 12 may communicate directly with the administrator database 14, e.g., if the administrator server 12 is at the same physical location as the administrator database 14. Alternatively, the administrator server 12 and administrator database 14 may be located at one or more different locations from one another, and may communicate via the network 10. Although only one administrator server 12 and administrator database 14 are shown, it will be appreciated that a single administrator server 12 may communicate with multiple administrator databases 14 (not shown), e.g., each database responsible for different geographic regions, and/or that multiple administrator servers (also not shown) may be provided for communicating with the same or different administrator databases.

Figure 2:
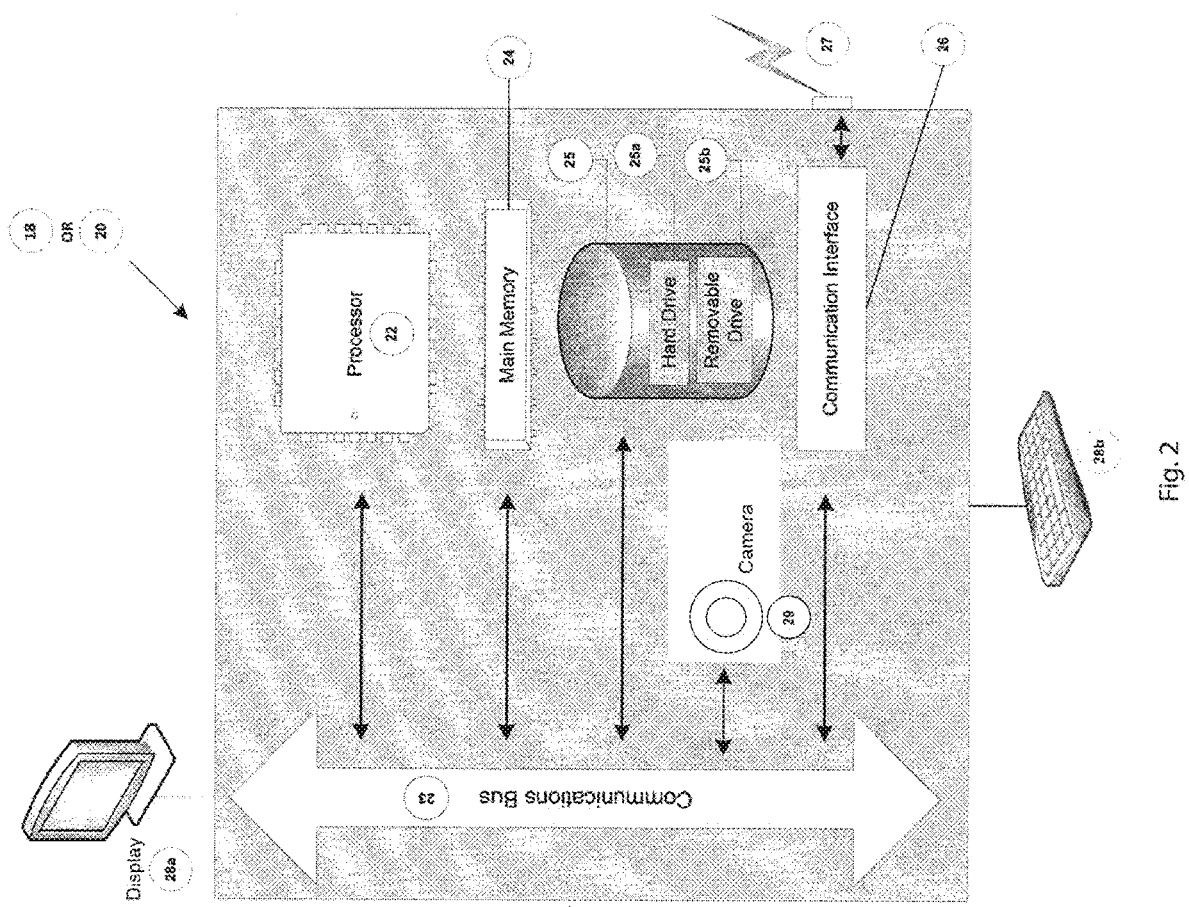
FIG. 2 is a schematic of an exemplary electronic device that may be used to conduct an inventory, e.g., which may be included in the system of FIG. 1.

Turning to FIG. 2, an exemplary embodiment of an electronic device is shown, e.g., an inventory device 18 (or alternatively a location register 20), that includes one or more hardware and/or software components for performing the functions and features described herein. As shown, the electronic device 18 may be a wireless device, e.g., a mobile, smart, and/or cellular telephone, a tablet computer, a personal digital assistant, a Wi-Fi device, a laptop computer, and the like, capable of communicating via the network 10 (not shown, see FIG. 1). The electronic device 18 generally includes one or more processors, such as exemplary processor 22, for completing the various tasks described herein, e.g., to display and/or modify menus to conduct inventories, as described further below. Additional processors (not shown) may be provided, such as an auxiliary processor to manage input/output or perform floating point mathematical operations, a special-purpose microprocessor having an architecture rapid execution of signal processing algorithms, a slave processor subordinate to the main processing system ("back-end processor"), and/or a coprocessor (not shown). Such auxiliary processors may be discrete processors or may be integrated with the processor 22.

The processor 22 is generally connected to a communication bus 23. The communication bus 23 may include a data channel for facilitating information transfer between storage and/or other components of the electronic device 18. The communication bus 23 may also provide signals required for communication with the processor 12, including a data bus, address bus, and/or control bus (not shown). The communication bus 23 may include any known bus architecture, for example, industry standard architecture (ISA), extended industry standard architecture (EISA), Micro Channel Architecture (MCA), peripheral component interconnect (PCI) local bus, IEEE 488 general-purpose interface bus (GPIB), IEEE 696/S-100, and the like.

The electronic device 18 also includes memory and/or storage devices, e.g., main memory 24 and optionally one or more secondary memory or storage devices 25. The main memory 24 may provide storage of instructions and/or data for programs executed on the processor 22. In exemplary embodiments, the main memory 24 may be semiconductor-based memory, such as dynamic random access memory (DRAM) and/or static random access memory (SRAM). In addition, other semiconductor-based memory may also be provided, such as synchronous dynamic random access memory (SDRAM), Rambus dynamic random access memory (RDRAM), ferroelectric random access memory (FRAM), and the like, as well as read only memory (ROM).

The optional secondary memory 25 (e.g., for the location register 20) may include a hard disk drive 25a and/or a removable storage drive 25b, for example, a flash drive, a floppy disk drive, a magnetic tape drive, an optical disk drive, a CDROM drive, a DVDROM drive, and the like (not shown). The removable storage drive 25 may read from and/or write to a removable storage unit (not shown) in a well-known manner. In exemplary embodiments, the removable storage unit may include a floppy disk, magnetic tape, optical disk, CDROM disk, DVDROM disk, and the like, which may be read from and/or written to by removable storage drive 25b. Additionally, the removable storage unit may include a computer usable storage medium with computer software and computer data stored thereon.

Optionally, the secondary memory 25 may include other components allowing computer programs and/or other instructions to be loaded into the electronic device 18. For example, such components may include semiconductor-based memory such as programmable read-only memory (PROM), erasable programmable read-only memory (EPROM), electrically erasable read-only memory (EEPROM), or flash memory (block oriented memory similar to EEPROM). Also included are any other interfaces and removable storage units that allow software and data to be transferred from the removable storage unit to the electronic device 18.

The electronic device 18 also generally includes one or more communication interfaces 26, e.g., one or more transceivers, receivers, and/or transmitters. Communication interface(s) 26 may allow software and/or data to be transferred between the electronic device 18 and the administrator server 12, the location register 20, and/or other external devices, networks, or information sources. Examples of communication interfaces 26 include but are not limited to an infrared or radiofrequency ("RF") interface (such as those that use the Bluetooth standard), a telecommunications interface, a modem, a network interface (for example an Ethernet card), a communications port, a PCMCIA slot and card, and the like. The communication interface(s) 26 may implement industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and the like. Software and/or data transferred via the communication interface 26 may be transferred using signals 27, such as electronic, electromagnetic, optical signals, and the like. The signals 27 may be implemented using wires, cables, fiber optics, telephone lines, cellular phone links, radio frequency (RF) links, and/or other communications channels.

Computer programming instructions, e.g., computer programs, software, or firmware, may be stored in the main memory 24 and/or the secondary memory 25. Computer programs may also be received via the communication interface 26. Such computer programs, when executed, may enable the electronic device 18 to perform one or more of the features described elsewhere herein.

As used herein, "computer program product" may refer to any media used to provide programming instructions to the electronic device 18. Examples of such media include removable storage units in removable storage drive 25b, a hard disk installed in hard disk drive 25a, and signals 27. Thus, a computer program product may include means for providing programming instructions to the electronic device 18.

Where the methods and/or features described herein are completed using software, the software may be stored in a computer program product and loaded into the electronic device 18, e.g., using the hard disk drive 25a, removable storage drive 25b, and/or communication interface 26. The computer programming instructions, when executed by the processor 22, may cause the processor 22 to perform the functions and features described herein. In addition or alternatively, one or more of the functions and features may be implemented primarily in hardware using hardware components, such as application specific integrated circuits ("ASICs").

In addition, the electronic device 18 may include one or more user interfaces 28, e.g., a display or other output device 28a, and a touch screen, keyboard, mouse, touch pad, and/or other input device 28b. The input device(s) 28b may facilitate a user controlling and/or otherwise communicating with the processor 22 or other components of the electronic device 18, while the output device(s) 28a may allow information to be presented and/or manipulated in a desired manner, e.g., to present a series of menus, fields, pages, and/or other images, as described elsewhere herein. In one embodiment, the electronic device 18 may include a touch screen (not shown) that may act as a display 28a and as an input device 28b, allowing the user to scroll through menus or images, and/or select icons, e.g., by touching or otherwise selecting corresponding images on the touch screen, as described elsewhere herein.

Optionally, the inventory device 18 may include a camera or other scanner element 29, e.g., the camera included in a conventional mobile phone. The camera or scanner element 29 may be activated to obtain images of labels, e.g., to identify packages or storage locations for individual items and/or quantities, as described elsewhere herein.

Figure 3:
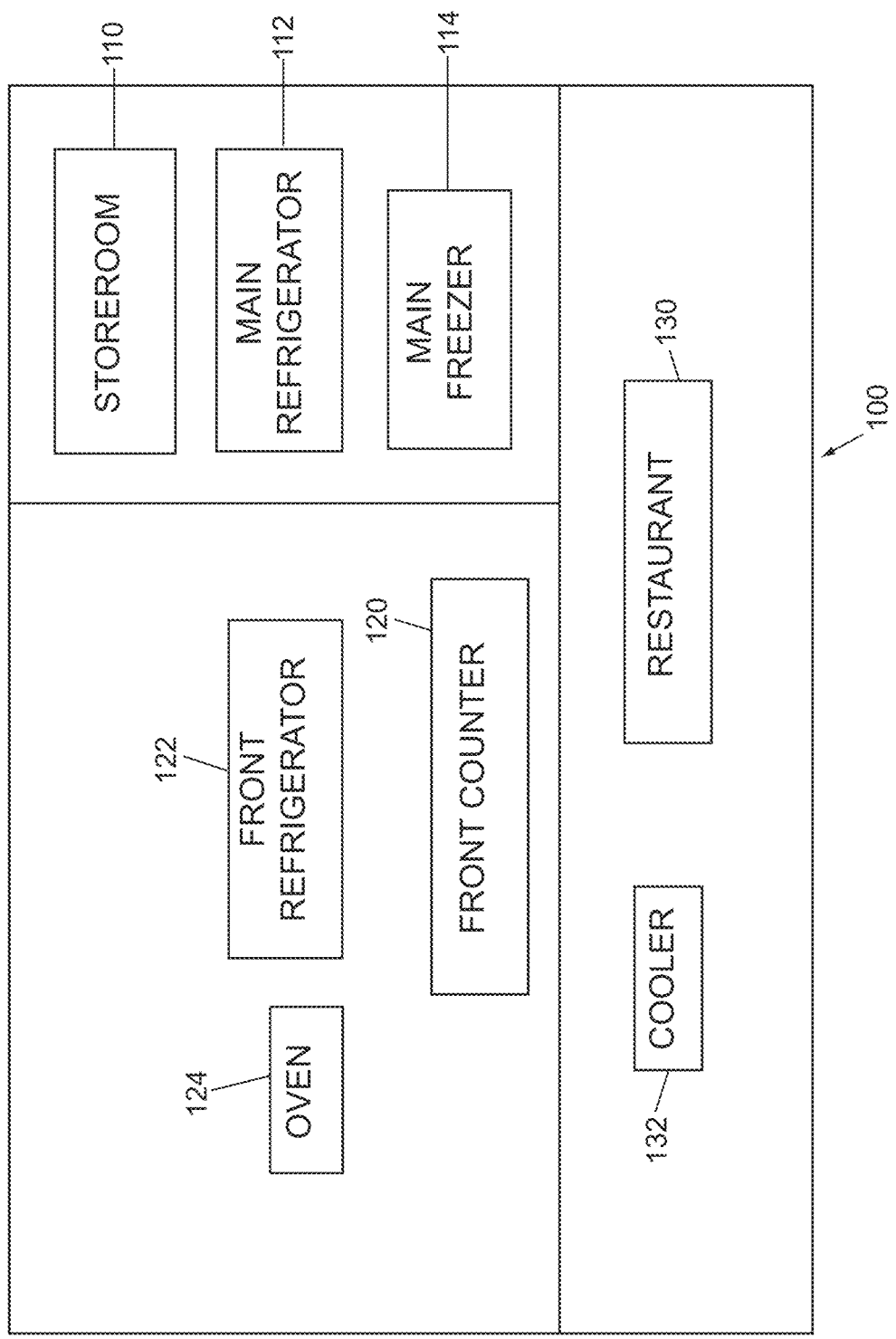
FIG. 3 is a schematic of an exemplary embodiment of a restaurant showing locations that may be included in an inventory.
Figure 4:
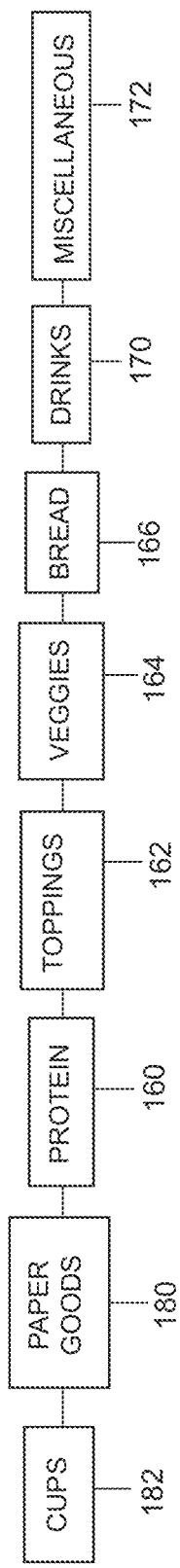
FIG. 4 is a table showing exemplary categories of food ingredients, products, and supplies that may be included in an inventory.
Figure 5:
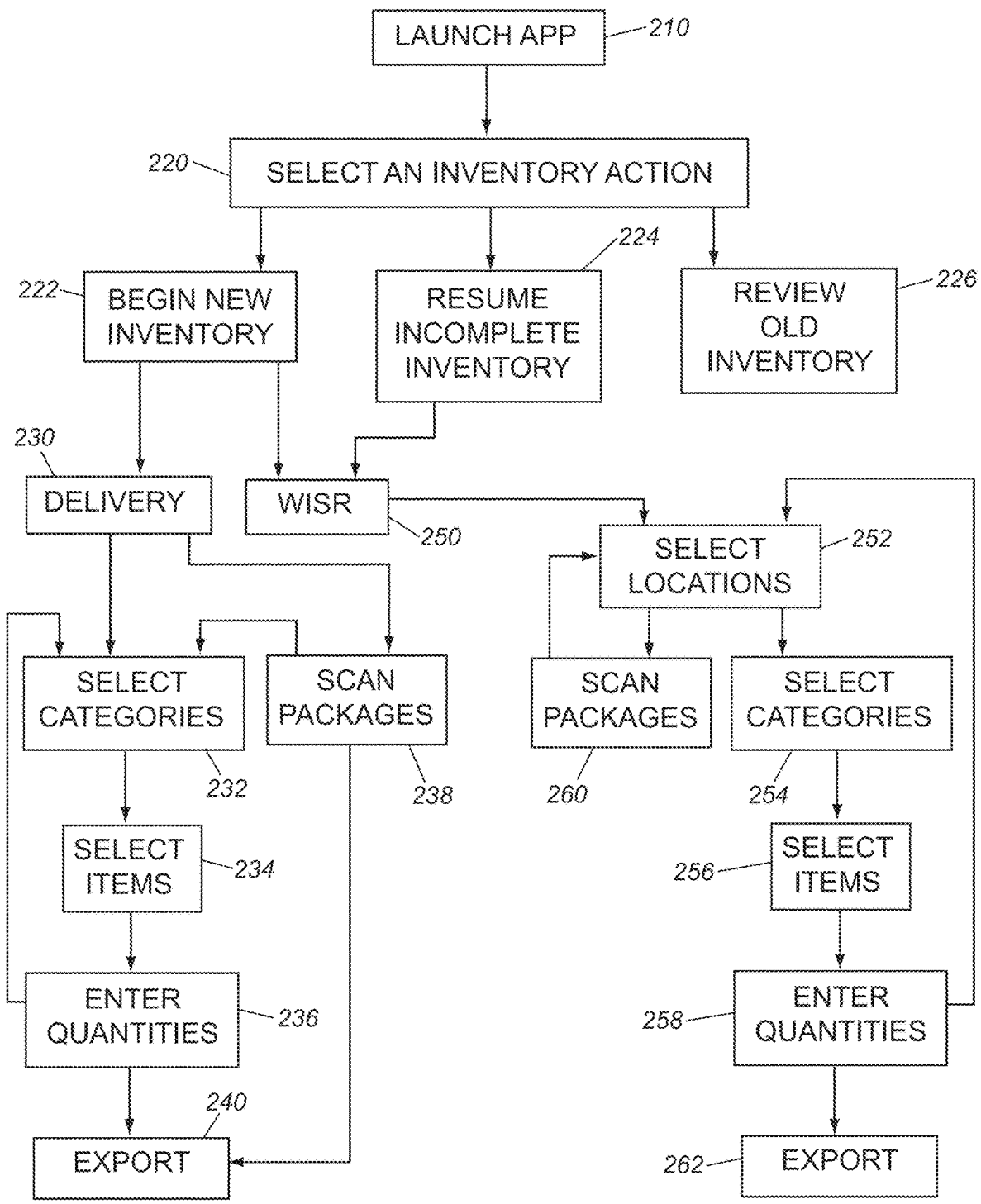
FIG. 5 is a flow chart showing an exemplary method for conducting one or more inventory actions for a restaurant.

Turning to FIGS. 3-5, in an exemplary method, the inventory device 18 (or multiple inventory devices 18) and/or the other components of the system 8 may be used to conduct an inventory at a desired location, for example, a restaurant 100, such as a Subway® restaurant. For example, FIG. 3 shows an exemplary schematic of a restaurant 100 including a plurality of storage locations where food ingredients, products, and/or other supplies for the restaurant may be stored or otherwise located, e.g., a storeroom 110, a main freezer 112, and a main refrigerator 114, which may be located in the back of the restaurant 100, a front counter 120, front refrigerator 122, and oven 124, which may be located in the area where employees may prepare and/or sell food products, and a restaurant display 130 and cooler 132, which may be located in the area of the restaurant accessible by customers. The inventory application may allow a user to select each of these storage locations, as desired, to identify and/or count products located at each storage location, as described elsewhere herein.

It will be appreciated that additional or fewer storage locations may be included than those shown in FIG. 3, e.g., depending upon the food and/or business of the restaurant or location. In addition or alternatively, the application may allow a user to select an available individual restaurant or location, whereupon the inventory device 18 may obtain necessary menus and/or options of storage locations, categories or supplies, and/or individual item information corresponding to the selected location. For example, when a specific location is selected, the inventory device 18 may communicate with the administrator server 12 to obtain database information applicable to the selected location. Thus, the inventory menus and/or other information may automatically be customized for the selected location, e.g., to accommodate variations between multiple locations. Alternatively, the user may be able to exclude or include one or more storage locations, e.g., by selecting/deselecting the storage location from the Settings page or other section of the application. Such customization may allow storage locations to be removed or added, e.g., based on a particular store's configuration.

In addition, FIG. 4 shows an exemplary list of categories of food ingredients, products, and other supplies that may be included in the inventory conducted using the inventory device 18. In the example shown, the categories may include a) ingredients or components for preparing food products, e.g., protein 160, toppings 162, veggies 164, bread 166, b) prepackaged food products, e.g., drinks 170 and miscellaneous items 172 (e.g., including chips, fruit packages, or other prepackaged snacks or side dishes), and/or c) non-food supplies, e.g., paper goods 180 and cups 182. Within each category, submenus may provide lists of specific items within the respective category, which may be separately itemized within an inventory. Optionally, the categories and/or specific items may be customized based on a specific location selected, as described above.

As described further below, the application may present one or more menus via the interface of the inventory device 18, e.g., on a touchscreen or other display 28a, allowing a user to navigate the menus, e.g., on a touchscreen or other input device 28b, to select storage locations, categories, specific items, quantities, and the like during an inventory. Thus, the interface may facilitate the user selecting a particular storage location and/or category of food products and supplies, and enter one or more quantities of items within the respective categories and/or storage locations, as described further elsewhere herein. For example, FIG. 10A shows an exemplary screen shot including specific items within a category "protein," which may be individually selected to enter amounts of respective items, as described further below. Exemplary items and categories that may be presented and/or otherwise included are shown and described in U.S. Publication Nos. 2013/0130208 and 2013/0238451, the entire disclosures of which are expressly incorporated by reference herein.

Before using the application for the first time, the application may be downloaded or otherwise loaded onto the inventory device 18, e.g., via the network 10 from the administrator server 12, a general application server, or other available server. When the application is downloaded or otherwise stored in memory 24 and/or 25, the application may include a long-term or indefinite database, e.g., stored in memory 25, and optionally, a short-term or temporary database, e.g., stored in memory 24 and/or 25. For example, the long-term database may include a database of storage locations, categories, and/or items, which may be indefinitely stored within the long-term database for past, present, and future inventories, e.g., optionally customized for an individual location, as described elsewhere herein. The temporary database may be used to store quantities and/or other information entered or otherwise used for an individual inventory or other current activity, as described further below.

Once the application is stored on the electronic device 18, at any time, the application may be used to conduct a new inventory and/or review old inventories. Initially, at step 210, the application may be launched, e.g., by selecting the desired application from a menu of available applications displayed on the display 28a. For example, an employee or other user using the inventory device 18 may use a touch screen, touch pad, keyboard, or other input device 28b to navigate through a menu of applications stored in memory 24 or 25 on the electronic device 18, and select the application by touching an icon representing the application on a touch screen, e.g., "clicking" on a touch pad, pressing "enter" on a keyboard or keypad, or otherwise using the input device 28b (similar methods may be used to select items from any of the menus or methods described elsewhere herein).

As described further elsewhere herein, the pages, fields, or other images related to the application may be displayed on the display 28a of the inventory device 18 in landscape or portrait orientation, e.g., as shown in the drawings herein. For example, the display 28a may have an aspect ratio in which the width is greater than the height (landscape orientation) or in which the width is smaller than the height (portrait orientation). Optionally, the inventory device 18 may include a display 28a that may be operated in either landscape or portrait orientation. For example, the inventory device 18 may include one or more accelerometers, gyroscopes, or other sensors that may determine the orientation of the display 28a, and the application may automatically display the images in the appropriate orientation based on the sensor information. Optionally, the Settings page(s) of the application may include options for configuring the display 28a to automatically rotate between landscape or portrait orientation, or to fix the display 28a in one orientation.

In addition or alternatively, pages, fields, or images presented on the display 28a may be larger than the physical area of the display 28a. For example, portions of menus, lists, and/or other information may be presented on the display 28a while other portions of the menus, lists, and/or information may be outside the active area of the display 28a. To view the areas beyond the portion shown, a user may scroll the image, e.g., by swiping a finger across a touch screen, using an arrow on a keyboard, clicking and sliding a mouse, and the like, to move adjacent portions onto the display 28a. During such actions, one or more headers or menu fields in the images may remain substantially stationary while the body of menus, lists, or other images may move, e.g., in proportion to the scrolling action of the user. In addition or alternatively, a user may change a scale of pages or images, e.g., by zooming in or out of an image, e.g., by pinching or spreading fingers contacting a touch screen, using "+" or "−" keys on a keyboard, and the like.

Figure 6A:
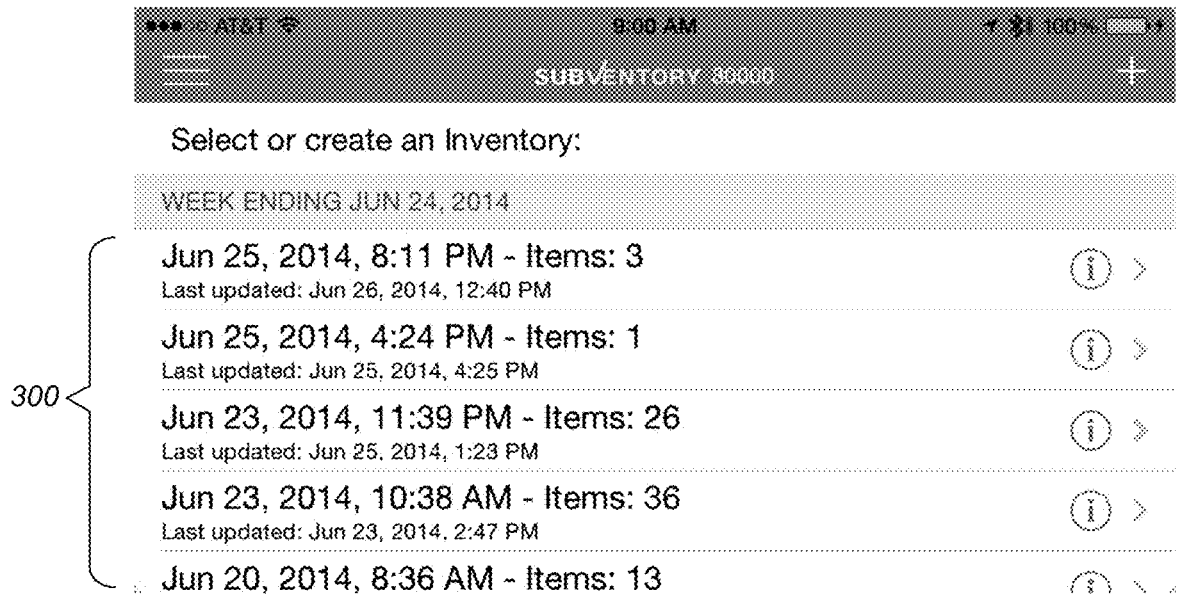
FIG. 6A is a screen shot showing an exemplary page that may be presented on an inventory device when a software application performing the method of FIG. 5 is initially launched.

Turning to FIG. 6A, an exemplary screen shot is shown that may be presented on the display 28a when the application is initially launched. For example, as shown, the user may be initially presented with a list of existing inventory actions 300 including a menu allowing the user to select whether to initiate a new inventory action, resume a previously incomplete inventory action, review a previous complete inventory action, and the like, e.g., using a touchscreen input field presented on the display 28a (or using another input device, not shown).

Optionally, when the application is launched, the inventory device 18 may present an authorization menu (not shown), e.g., requiring the user to enter a Username and Password before the application launches and allows the user to access and/or enter information. Once the user has entered a valid Username and Password, the application may launch and present a default page, e.g., similar to the screen shot shown in FIG. 6A. However, the available inventory actions included in the action list 300 may only include inventory actions for which the user is authorized, e.g., new or incomplete inventories (e.g., if the user is an employee not authorized to review previous completed inventories), or inventories for only one or more locations (e.g., if the user is an employee at only one or more specific restaurants or stores).

Returning to FIG. 5, at step 220, the user may select an inventory action, e.g., from the list 300 shown in FIG. 6A. In the exemplary embodiments shown in FIG. 5, the available inventory actions may include beginning a new inventory action 222, resuming a current yet incomplete inventory action 224, or reviewing an old complete inventory action 226.

Figure 6B:
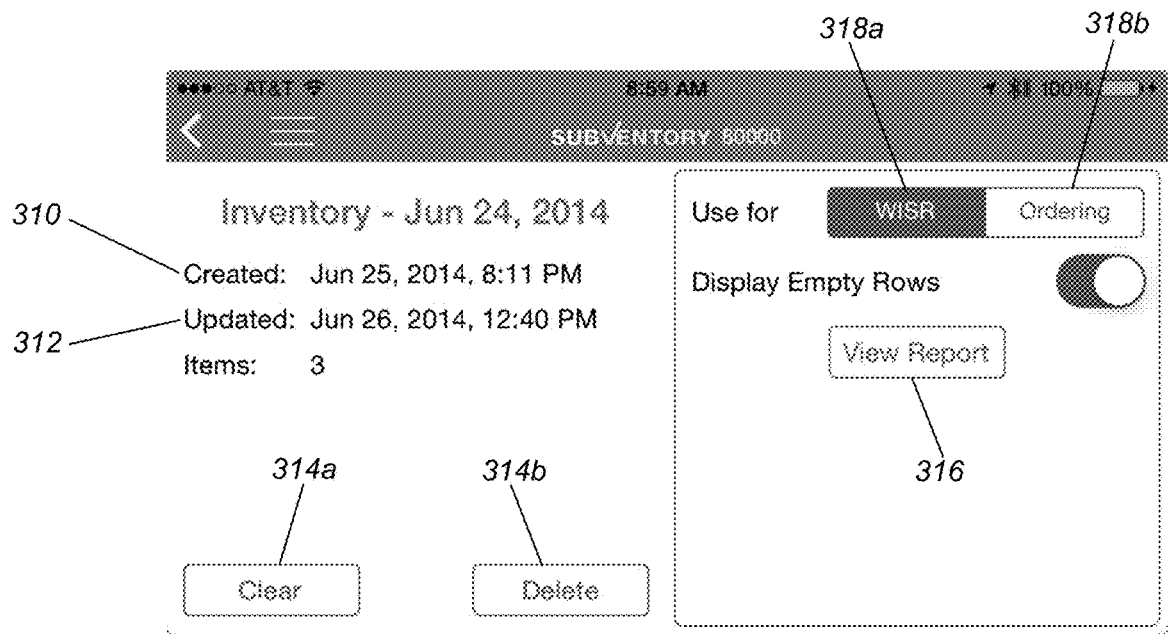
FIG. 6B is a screen shot showing an exemplary page that may be presented on an inventory device when an inventory action is selected from the list or a new inventory action is created, e.g., allowing the user to create, access, and/or modify the selected inventory action and/or records.

Turning to FIG. 6B, an exemplary screen shot is shown that may be presented when an inventory action is selected from the list or a new inventory action is created from the list 300 shown in FIG. 6A. The user may edit available fields (or fill them in for a new inventory action). For example, the Created field 310 of the page may include the date the inventory action was created (e.g., defaulting to the current date for a new action), and/or the Updated field 312 may include the date in which the action was updated, e.g., if an inventory is currently being conducted and not yet completed. If authorized, the user may clear or delete the displayed inventory action, e.g., by selecting the clear or delete icons 314a, 314b. Optionally, the page may allow the user to generate one or more reports, e.g., by selecting the Report icon 316 to determine the status of an inventory currently being undertaken and the like, which may result in a report being presented on the display, e.g., similar to exemplary reports shown and described elsewhere herein.

For a new inventory action, the user may identify the type of inventory action by selecting available options presented on the display. For example, as shown in FIG. 6B, the user may be able to select one of the "WISR" icon 318a (weekend inventory sales report) to select a new inventory of on-hand products or the "Ordering" icon 318b to select an action to identify products to be ordered or products being delivered. A WISR action may initiate a new inventory of products on-hand, e.g., which may be scheduled to be completed on a periodic or other regular basis, i.e., weekly or otherwise. An Ordering action may enable inventorying products when a delivery has been received at the location or may allow the user to select items to be ordered to replenish the current stock.

Returning to FIG. 5, an exemplary method is shown for completing a delivery inventory action 230, which is referenced in the following description (which may also reference other drawings showing representative screen shots or pages that may be presented on the inventory device 18 while performing the method). As shown, during the method, the user may navigate one or more menus to identify and select quantities of individual items that have been delivered to the location. For example, as described elsewhere herein, the inventory device 18 may present a category menu including available categories of food products and/or supplies, allowing the user to select a category corresponding to items that have been delivered, at step 232. Exemplary images of category menus that may be presented are shown in FIGS. 9A and 13A, e.g., including the categories shown in FIG. 4.

The inventory device 18 may then present an item menu including individual items available under the selected category, allowing the user to select individual items to inventory, at step 234. Exemplary images of an item menu for the category "Protein" are shown in FIGS. 10A, 10B, 14A, and 14B. When the user selects a desired item from the item menu, a quantity page may be presented on the inventory device 18, allowing the user to enter a quantity for the selected item, at step 236. Exemplary images of quantity pages that may be presented on the inventory device 18 are shown in FIGS. 10C, 10D, and 15A-15C.

For example, the user may enter an integer value in the field corresponding to the size of the container within which the items are delivered, e.g., a case of a predetermined number of individual items, weight of the item, and the like. Once the quantity is entered, the user may select one or more additional items from the same category to enter their quantities delivered and/or may select one or more additional categories to select items and enter quantities for all of the products received in the delivery, as shown in the repetition of steps 232-236 in FIG. 5. Exemplary methods for navigating the menus between the categories and items are described elsewhere herein.

In addition or alternatively, at step 238, the user may use the inventory device 18 to scan packages of items in a delivery, e.g., rather than navigating through all of the category and item menus. For example, the application may include a scanner module, e.g., using the camera 29 of the inventory device 18 to scan a label of the delivered packages. For example, the scanner module may be activated from an Actions or other menu, a Scan icon, and the like presented on the electronic device, as described elsewhere herein. Once activated, the camera 29 may be oriented towards the desired label, and activated, e.g., by selecting a scan icon presented on the inventory device 18 or even the camera button on the inventory device 18.

Upon initiation of the scanner module, the camera 29 may acquire a digital image of the label and the processor 22 may analyze the label to identify identification symbols on the label, e.g., a barcode, QR code, and the like, that may identify one or more of the category, item, and quantity of the item within the package corresponding to the scanned label. In one embodiment, the long-term database of the application may include tables associating specific label identifiers with respective items and/or quantities. Alternatively, the processor 22 may send an inquiry to the administrator server 12 to obtain information regarding the item associated with the scanned label.

Exemplary images showing a scanner module being used to scan labels of packages are shown in FIGS. 9B-9D and 13D-13F. As shown, once the label is scanned and analyzed, the inventory device 18 may present an item identified by the label and present a quantity menu, allowing the user to enter the quantity of the items received. Thus, the scanner module may simply be used to identify items within available categories, and prompt the user to count and enter the actual quantities delivered. Alternatively, the label may automatically identify the quantity, e.g. such that the user may simply scan each package that is delivered, and the inventory device 18 may add each package as they are scanned.

Returning to FIG. 5, once all of the delivered items have been entered, the delivery may be exported, at step 240. For example, once the items and quantities have been entered from the available menus (or scanning available labels), the user may select an Export icon from a menu on the inventory device 18, whereupon the inventory device 18 may communicate the delivery information to the administrator server 12, location register 20, and/or other remote location, e.g., via the network 10. Optionally, the administrator server 12 may simply store the delivery information in the database 14 for subsequent retrieval, or the administrator server 12 may communicate the delivery information to the location register 20 at the delivery location. If the expected delivery information is available within the database 14 or the location register 20, e.g., generated when the order for the delivered items was placed, the expected delivery information may be compared with the delivery information received from the inventory device 18.

If there is a discrepancy between what was expected and what was included in the delivery information, a communication may be sent back to the inventory device 18, e.g., itemizing the discrepancy. Given this communication, the user can recount or otherwise confirm that no error was made in the actual items received or correcting the error if generated by the user miscounting the actual items delivered. If the discrepancy is confirmed to be correct, the user may make appropriate records, e.g., using the inventory device 18 and/or on documents included with the delivery.

In a further alternative, when a user selects a delivery action, the inventory device 18 may communicate with the administrator server 12 and/or location register 20 via the network to obtain the expected delivery information, and the inventory device 18 may complete an audit between the expected and actual delivery locally, e.g., in real-time as items are scanned.

Returning to FIG. 5, another exemplary method is shown for conducting an inventory of products on-hand at a location, e.g., at a restaurant or store where the user and inventory device 18 are located. For example, as shown, when a new inventory action is started, the user may select a WISR action, at step 250. Although WISR actions are generally completed on a weekly basis, e.g., on a particular day each week, it will be appreciated that such actions may be completed more or less frequently for all or some categories of products on-hand at the location.

Although a complete inventory of all food ingredients, product, and supplies may be conducted (and typically will be on a regular basis), the user may conduct a partial inventory, e.g., by selecting one or more storage locations, categories, items, vendors, and the like, as described elsewhere herein. Such a partial inventory may also be performed when there is a discrepancy is identified in a completed inventory, e.g., limited to the categories or items that do not match expected results. Thus, the partial inventory may be used to identify errors or confirm that there is an actual discrepancy between products on-hand and expectations, e.g., based on consumption projections obtained from sales and/or other reports, as described elsewhere herein.

Initially, at step 252, after selecting a new inventory action (or resuming an incomplete inventory action), a location menu may be presented on the inventory device 18, allowing the user to select individual storage locations at the restaurant or store and inventory the items at each storage location. For example, as described above and shown in FIG. 3, a restaurant 100 may include a plurality of storage locations, e.g., in the back of the restaurant 110-114, behind the front counter of the restaurant 122-124, and/or in the customer area of the restaurant 130-132.

In an exemplary method, the inventory device 18 includes a touchscreen, and the user may select the desired storage location simply by touching the touchscreen over the representation of the desired storage location. As shown, in exemplary embodiments, the representations may include photo images of the actual storage locations for the store being inventoried or an image of a representative storage location, and/or may include text identifying the storage location. Exemplary screen shots or pages showing location menus that may be presented on the inventory device 18 are shown in FIGS. 8A and 12A, e.g., corresponding to the restaurant locations shown in FIG. 4.

During a complete inventory, the quantities of all of the items in all categories need to obtained from each storage location and included in a final report that may be generated and/or analyzed. Alternatively, only specific categories may be inventoried in a particular inventory action, if desired.

In an exemplary method, a single inventory device 18 may be used to complete the inventory. Alternatively, multiple users using individual inventory devices 18 may divide responsibility for inventorying different storage locations. In this alternative, at any time, data may be transferred from one inventory device to another, i.e., to generate a single master inventory in the receiving inventory device, as described elsewhere herein. Alternatively, a first inventory device may be established as the master and any additional inventory devices may communicate their data with the first inventory device, which may maintain the totals from the inventory.

In a further alternative, the individual inventory devices 18 may maintain a database of the items inventoried, and the inventory information may be consolidated, e.g., upon completing the inventory, by communicating the separate portions of the inventory to the administrator server 12 or the location register 20. Optionally, in this alternative, after a storage location has been inventoried using one of the inventory devices, that storage location may no longer be available on the menus, e.g., to prevent user's of other inventory devices from accidentally duplicating items.

Turning to FIG. 9A, an exemplary screen shot or page is shown that may be presented on the inventory device 18 when the "Front Counter" storage location is selected from the location menus of FIG. 8A or 12A. As shown, the page may include a Category menu including available categories to be inventoried. In one embodiment, each storage location menu may include all of the categories included in the inventory. Alternatively, the location menus may only include categories that could be located at the respective storage locations. For example, the categories "Paper Goods" and "Drink Cups" may be omitted from the location menus for the "Refrigerator" or "Freezer" locations since these categories would not be stored at these storage locations.

In an exemplary method, the inventory device 18 includes a touchscreen, and the user may change the Category menu presented on the display simply by touching and sliding a finger on the touchscreen, e.g., to the left or right. As shown in FIG. 9A, the Category menu for the "Front Counter" location may include headings for the adjacent locations such that, when the user swipes to the left, the category menu for the "Refrigerator" location may be presented or when the swipes to the right, the Category menu for the "Restaurant" location may be presented (not shown). Thus, the user may easily scroll sequentially through the storage locations (e.g., with the storage locations looped such that the last storage location wraps around to the first storage location in a continuous loop).

As shown in FIG. 9A, in an exemplary embodiment, each category in the Category menu may include a photo image of a representative item from the category and text identifying the category. Thus, the user may select a desired category simply by touching the touchscreen over the field for that category.

When a category is selected from the Category menu, an Item menu for that category may be presented on the display including representations or fields for the available items within the selected category, allowing the user to select individual items from that category, at step 256. For example, FIG. 10A shows an exemplary screen shot of an Item menu for the "Protein" category, e.g., including a plurality of representative photo images and text identifying the items, which may be selected to enter quantities of each item, at step 258.

Similar to the Location menu, the user may scroll through a sequence of Item menus for the different categories of items that may be stored at the previously selected storage location (which may also be presented at the top or otherwise on each Item menu to prevent confusion or other error). If the user decides they want to change storage location, the user may select a "'Back" or "<" icon on the page, whereupon the Location menu may again be presented on the display.

From the Item menu, e.g., shown in FIG. 10A, the user may select an individual item, whereupon a Quantity page and/or menu may be presented on the display, such as that shown in FIG. 10C, where the item "Meatballs" has been selected from the "Protein" Category menu.

As shown in FIG. 10C, the Quantity menu may include a plurality of fields including different sizes of packages or containers in which the selected item may be stored, e.g., a "Case" field, a "Bag" field, a "Pound" field, and a "⅓ container" field. For example, meatballs may be provided in cases when delivered from the vendor, which may include multiple bags (e.g., two bags). Thus, within a main refrigerator or freezer, entire cases or individual bags may be stored. In addition, an open bag may be separated into one or more containers (e.g., "Cambros" containers), e.g., by dividing the bag into a predetermined number of containers. The resulting containers and partial bags may be stored in the main refrigerator, a front refrigerator (e.g., for easy access from the front counter of the restaurant), or in the front counter itself (e.g., where employees are preparing food products including the items).

Rather than converting the quantities of items identified at a particular storage location, which may introduce user miscalculation or other error, the user may simply enter into the respective quantity fields the number of items at the storage location based on each quantity size. For example, as shown in FIG. 10C, the user has entered quantities indicating that there is one case, one bag, three pounds, and 4⅓ containers in the main refrigerator. Since the user simply enters the quantities based on what they identify or actually see, errors may be minimized. In exemplary embodiments, as shown, the user may enter the quantities by selecting the desired quantity field and hitting "+" or "−," by entering a number from the keypad, or by adding up numbers using the calculator pad.

In addition, the Quantity page and menu may include total information for the selected item. For example, as shown in FIG. 10C, the Quantity page indicates that a total of 2.8 cases of meatballs are stored in the main refrigerator. To present this information, the inventory device 18 may include conversion factors (e.g., based on the equivalents identified in the quantity fields and/or stored in the database for the application) and automatically convert the individual quantities to the selected unit of measure and add them up based on the selected unit of measure. For example, in FIG. 10C, the unit of measure "Case" is highlighted, thereby providing a visual indication to the user that the total 2.8 corresponds to cases and not to one of the other units of measure. By comparison, in FIG. 10D, the unit of measure "Pound" is highlighted, thereby providing a visual indication to the user that the total 28 corresponds to pounds and not cases. Thus, if the user selects a different unit of measure from the quantity fields, the inventory device 18 may automatically convert and add up the total quantities in the selected units.

Optionally, the Quantity page may include additional information related to the selected item. For example, as shown in FIG. 10C, adjacent the quantities entered by the user in the quantity fields and the total quantity for the selected storage location, the quantity page may include totals for the entire restaurant or store. For example, as the user navigates through each storage location and enters quantities for individual items, the inventory device 18 may add the quantities and present the current storewide totals on the quantity page for the selected item, e.g., in real time as the inventory is being conducted. Thus, in the exemplary quantity page shown in FIG. 10C, the total quantity of meatballs in the main refrigerator may be 2.8 cases (or 28 pounds as shown in FIG. 10D) based on the quantities entered by the user, resulting in a grand total quantity within the entire restaurant of 8 cases (or 80 pounds as shown in FIG. 10D). Such grand totals may be useful to the user during the inventory for planning purposes, e.g., if the user is also preparing an order plan to purchase additional supplies.

Once the user has entered the identified quantities for the selected item in the quantity fields, e.g., as shown in FIGS. 10B and 10C, the user may select a "Finished" or "Return" icon, such as the "<" icon shown adjacent the main menu. When this icon is selected, the quantities may be saved and the Item menu for the selected category (and storage location) may again be presented, e.g., such as the item menu shown in FIG. 10A.

In addition or alternatively, at step 260, the user may scan labels at the storage location to select items and/or quantities. For example, as shown in FIGS. 9A-9C, a label at the Front Counter location may be scanned, e.g., using the camera 29 and scanner module of the application, as described elsewhere herein. In one embodiment, the label may simply identify the item, and the inventory device may then present a quantity menu, e.g., as shown in FIG. 9C, identifying the item associated with the label and allowing the user to enter the actual quantities of the item identified by the label. Alternatively, the label may include both item and quantity identifiers, e.g., if the label of an unopened case is scanned, the inventory device 18 may default the quantity to a full case (or equivalent if another unit of measure is selected). The user may confirm the quantity, e.g., after visually confirming that the case is, in fact, full. Optionally, multiple labels may be scanned, if available, to identify and enter quantities of items in addition to or instead of using the scrolling menus.

Thus, in this manner, the user may navigate systematically through the category menus and item menus at each storage location, entering the quantities and generating an inventory of all of the identified items.

At step 262 in FIG. 5, once the inventory is complete, the user may export the inventory information, e.g., to the administrator server 12 and/or the location register 20 via the network. The resulting report and/or data may be used for a variety of purposes. For example, the location register 20 or administrator server 12 may generate reports projecting consumption of food ingredients, products, and/or supplies, e.g., based on sales and/or other business information. For example, each sandwich or other prepare food product may consume a predetermined amount of ingredients when properly prepared.

With the completed inventory report, the estimated consumption of supplies may be subtracted from the totals from the most recent previous inventory and/or any deliveries may be added to the previous inventory totals to generate a projection of expected quantities for each of the food products and supplies. If there is a significant inconsistency between the actual total for a given item and the projected quantity, the user (and/or management of the location) may conduct additional reviews to identify the source of the inconsistency. For example, if desired, a partial inventory may be repeated (e.g., using the inventory device 18) of any items that have a discrepancy to determine whether the first inventory was performed accurately. If not, the partial inventory may facilitate identifying the error and confirming that the actual totals and projected totals match.

If a partial inventory confirms a discrepancy, the user and/or management may investigate the cause of the discrepancy, e.g., mislabeled supplies, excessive use or waste (e.g., due to poor training or other problems with staff preparing food products, theft, and the like). Thus, the systems and methods herein may facilitate obtaining and maintaining accurate inventories and stocks efficiently, and may facilitate taking corrective action if needed.

In addition, the systems and methods herein may be used to plan future orders or even generate lists and quantities of items to be ordered based on individual inventories, trends over periods of time, e.g., year-to-year, seasonal trends, weather projections, and the like. For example, the location register 20 (or the administrator server 12) may analyze information from one or more inventories and create an order to restock the restaurant or store to maintain desired levels of food products and supplies. Management may accept and place the proposed order or may manually adjust the order, as desired, e.g., again based on trends, upcoming specials, and the like.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the scope of the appended claims.

I claim:

1. A method for conducting an inventory of products on-hand for a restaurant or other store using a plurality of mobile electronic devices, each comprising a display and a user interface, comprising:
    presenting on a first display of a first electronic device a location menu of available storage locations at the store;
    selecting, using a first user interface of the first electronic device, a first storage location from the location menu, whereupon a first category menu is presented on the first display that includes a plurality of categories of products to be inventoried;
    selecting, using the first user interface, a first category from the first category menu, whereupon a first item menu is presented on the first display that includes representations of items within the first category;
    selecting, using the first user interface, a first item from the first item menu, whereupon a quantity menu is presented on the first display;
    entering, using the first user interface, a quantity into the quantity menu corresponding to the quantity of the first item at the first location within the store;
    selecting, using the first user interface, a finished icon when the quantity is entered, whereupon the first item menu is presented on the first display, and wherein a representation of the first item includes an indicator that the quantity has been entered;
    transmitting inventory data from the first electronic device to each of the other electronic devices, the inventory data including identification of the first storage location;
    preventing the other electronic devices from conducting an inventory of the first storage location based upon the inventory data received from the first electronic device.

2. The method of claim 1, further comprising:
    selecting, using the first user interface, a second item from the first item menu, whereupon a quantity menu is presented on the first display;
    entering, using the first user interface, a quantity into the quantity menu corresponding to the quantity of the second item at the first location within the store; and
    selecting, using the first user interface, a finished icon when the quantity is entered, whereupon the first item menu is presented on the first display, and wherein a representation of the second item includes an indicator that the quantity has been entered.

3. The method of claim 1, wherein the indicator is a confirmation indicator.

4. The method of claim 1, further comprising:
    selecting a second category from the first category menu, whereupon a second item menu is presented on the first display that includes representations of items within the second category;
    selecting a second item from the second item menu, whereupon a quantity menu is presented on the first display;
    entering a quantity into the quantity menu corresponding to the quantity of the second item at the first location within the store; and
    selecting a finished icon when the quantity is entered, whereupon the second item menu is presented on the first display, and wherein a representation of the second item includes an indicator that the quantity has been entered.

5. The method of claim 4, wherein the first user interface comprises a touchscreen, and wherein the second category is selected by swiping on the touchscreen to replace the first item menu with the second item menu.

6. The method of claim 4, wherein the second category is selected from a pulldown menu on the first display.

7. The method of claim 1, further comprising:
    selecting a location menu icon whereupon the location menu is presented on the first display;
    selecting a second storage location from the location menu, whereupon a first category menu is presented on the first display that includes a plurality of categories of products to be inventoried;
    selecting a first category from the first category menu, whereupon a first item menu is presented on the first display that includes representations of items within the first category;
    selecting, using the first user interface, a first item from the first item menu, whereupon a quantity menu is presented on the first display;
    entering, using the first user interface, a quantity into the quantity menu corresponding to the quantity of the first item at the second location within the store; and
    selecting, using the first user interface, a finished icon when the quantity is entered, whereupon the first item menu is presented on the first display, and wherein a representation of the first item includes an indicator that the quantity has been entered.

8. The method of claim 1, wherein the quantity is entered by:
    activating a scanner of the first electronic device;
    directing the scanner towards a label associated with a package containing the first item; and
    activating the scanner whereupon the first electronic device acquires an image of the label and analyzes the label to identify the quantity of the first item.

9. The method of claim 1, wherein the quantity menu includes a plurality of available container sizes, and wherein entering the quantity comprises entering a quantity for one or more of the available container sizes, whereupon the first electronic device presents a total amount of the first item based on the quantity entered for each of the available container sizes.

10. The method of claim 9, wherein the first electronic device presents a total amount on the first display indicating a total quantity of the first item at the first location of the store and a grand total indicating a grand total quantity of the first item at all storage locations of the store.

11. The method of claim 1, further comprising, upon completion of the inventory, selecting an export icon, whereupon information regarding the quantities of items entered during the inventory are communicated by the first electronic device to a remote server via a network.

12. The method of claim 11, further comprising:
generating, by the remote server, a projection of expected quantities of the items based at least in part on the inventory; and
creating an order to restock the restaurant or other store to maintain desired levels of the items at the restaurant or other store.

13. The method of claim 11, further comprising:
generating, by the remote server, a projection of expected quantities for of the items based at least in part on the inventory; and
identifying, by the remote server, any discrepancy between the quantities of items entered during the inventory and the projection to facilitate investigation of any discrepancy.

14. The method of claim 1, wherein preventing the other electronic devices from conducting an inventory of the first storage location comprises removing the first storage location from a location menu of available storage locations presented on the other electronic devices.

15. A method for conducting an inventory of products on-hand for a restaurant or other store using a plurality of portable electronic devices, each comprising a respective display and a respective user interface, the method comprising:
presenting a series of menus on each display identifying storage locations at the store, categories and individual food items that may be stored at respective storage locations;
providing an interface in which a user of each device selects individual storage locations at the store and enters via the user interface quantities of food items stored at the individual storage locations;
each of the electronic devices receiving a selection of one or more storage locations and quantities of food items stored at the respective storage locations via the respective user interface;
transferring inventory data from each of the electronic devices to each of the other electronic devices, the inventory data including identification of each of the storage locations which were selected on each electronic device and for which quantities of food items stored at the such storage locations were entered, such storage locations referred to as inventoried storage locations; and
preventing each of the electronic devices from conducting an inventory of the inventoried storage locations based upon the inventory data received from the other electronic devices.

16. The method of claim 15, wherein providing an interface comprises:
identifying when a first food item is selected from one of the menus to enter quantities of a first food item at a first storage location; and
presenting on the display a quantity of the first food item entered via the user interface at the first storage location and a total quantity of the first food item entered to date during the inventory.

17. The method of claim 16, further comprising:
presenting on the display a quantity menu including different sizes of available containers for the first food item such that the user can enter the quantity of each of the available containers of the first food item at the first storage location, and
presenting a total amount of the first food item based on a unit measure of one of the available sizes.

18. The method of claim 15, further comprising:
scanning labels of containers of food items stored at the storage locations, whereupon the electronic devices identify food items and quantities of respective food items from the labels.

19. The method of claim 15, wherein each of the electronic devices stores quantities of food items independently of other electronic devices until completion of the inventory, the method further comprising:
communicating the quantities of food items entered using each of the electronic devices to a remote electronic device configured to provide a total amount of the quantities of the food items.

20. The method of claim 15, wherein one of the electronic devices comprises a master device including memory for storing cumulative totals of the quantities of food items entered during the inventory, and wherein the other electronic devices communicate quantities of food items entered to the master device for storage in the memory.

21. The method of claim 15, wherein preventing the electronic devices from conducting an inventory of the inventoried storage locations comprises removing the inventoried storage location from the respective menu identifying storage locations presented on the respective electronic devices.

* * * * *